United States Patent
Yagi

(10) Patent No.: US 8,281,316 B2
(45) Date of Patent: Oct. 2, 2012

(54) EVENT DIRECTION DETECTOR AND METHOD THEREOF

(75) Inventor: Hiroyuki Yagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1668 days.

(21) Appl. No.: 11/651,352

(22) Filed: Jan. 9, 2007

(65) Prior Publication Data

US 2007/0198239 A1    Aug. 23, 2007

(30) Foreign Application Priority Data

Jan. 11, 2006   (JP) .................... 2006-004110

(51) Int. Cl.
*G06F 3/00* (2006.01)

(52) U.S. Cl. .......................... 719/310; 710/1
(58) Field of Classification Search .................. 719/318; 710/1
See application file for complete search history.

(56) References Cited

U.S. PATENT DOCUMENTS

| | | | |
|---|---|---|---|
| 2004/0028232 A1* | 2/2004 | Lindemann et al. | 380/259 |
| 2005/0141601 A1* | 6/2005 | Renaud et al. | 375/219 |

FOREIGN PATENT DOCUMENTS

| | | |
|---|---|---|
| JP | 6 70574 | 3/1994 |
| JP | 11 282888 | 10/1999 |
| JP | 2004 86786 | 3/2004 |

OTHER PUBLICATIONS

Ladislau, A multi-Plane State Machine Agent Model, 2000.*

* cited by examiner

*Primary Examiner* — Lechi Truong
(74) *Attorney, Agent, or Firm* — Frommer Lawrence & Haug LLP; William S. Frommer

(57) ABSTRACT

Event direction detection method that distinguishes an external event from an internal event and detects a direction of an event, includes the steps of: acting as intermediary of input/output of the external event and transferring external event input to an external event output; acting as intermediary of input/output of the internal event and transferring internal event input to an internal event output; transferring the outputs to finite state machine of a block; receiving and editing external event input terminal, via which the external event is input, and external event output terminal via which the external event is output; receiving and editing the first acting and transferring step; receiving and editing internal event input terminal, via which the internal event is input, and internal event output terminal via which the internal event is output; and receiving and editing the second acting and transferring step.

5 Claims, 28 Drawing Sheets

Man-machine interface    Communication path    CPU $a = F(x);$

FIG. 27

EVENT DIRECTION DETECTOR AND METHOD THEREOF

BACKGROUND OF THE INVENTION

1. Field of the Invention

The present invention relates to an event direction detector and its method, which are efficient for evaluating an architecture during the system level design, and to the design engineering field of semiconductor large-scale integrated circuits including microprocessors, so-called SoC (System on a Chip). In particular, the present invention relates to a modeling method of a functional block of a system and to a modeling of higher-level communication among blocks and algorithms when hardware blocks and software blocks are determined in the system architecture design stage and its cooperative development, cooperative design, and cooperative verification environments are built.

2. Description of Related Art

Conventionally, the rule or procedure for converting an algorithm to a system-level model depends on the system-level design language or simulator used for the conversion.

Patent Document 1 discloses a "reconfigurable master/slave control method and device" for reconfiguring the master/slave operation.

This document proposes a control method and a control device in which the master operation or slave operation is held as a switching value for reconfiguring a combination of the master and the slave.

[Patent Document 1] Japanese Laid-Open Patent JPH6-70574

SUMMARY OF THE INVENTION

The technology described in Patent Document 1 cannot configure a computer-simulated computing device for use at system design time. In addition, the technology cannot dynamically reconfigure the device once set up.

In particular, when a system-level design language is used to describe the control of an event or message and the direction of data that are determined by a rule assumed implicitly by an algorithm, the problem is that the control and the data must be separated in a model and a lower-level communication protocol, which is usually not necessary for algorithm development, is taken into consideration.

In a higher-level description of an inter-block master/slave communication system that is currently used, the remote procedure call, as known as RPC, is used in which the calling block directly calls a target slave processing function in a called block and, therefore, the behavior of the communication cannot be observed.

In addition, in a complex system created by combining multiple algorithms, the synchronization/coordination of communication between algorithms or, in some cases, the polymorphism of the algorithm itself must be considered. There is no environment in which such a complex system is designed.

In view of the foregoing, there is a need for an event direction detector and its method, for use when converting an algorithm to a system model during the system design, that perform automatic addition and replacement without considering a lower communication protocol to help the user to build a model easily and speedily.

There is also a need for an event direction detector and its method that can statically or dynamically control a complex system when the designer intends to.

In a first aspect of the present invention, an event direction detector includes an event detection part that includes a finite state machine part in a steady state and an event driven processing unit, distinguishes between an external event and an internal event, and detects an direction of an event, the finite state machine part and the event driven processing unit being combined via a shared variable internal to a block; an external event input terminal via which an external event is input; an external event output terminal via which the external event is output; a first operation function that acts as an intermediary of an input/output of the external event and that transfers an external event input to an external event output; an internal event input terminal via which an internal event is input; an internal event output terminal via which the internal event is output; a second operation function that acts as an intermediary of an input/output of the internal event and that transfers an internal event input to an internal event output; a third operation function that transfers the outputs to the finite state machine of the block; a first editing function that receives and edits the external event input terminal, via which the external event is input, and the external event output terminal via which the external event is output; a second editing function that receives and edits the first operation function; a third editing function that receives and edits the internal event input terminal, via which the internal event is input, and the internal event output terminal via which the internal event is output; and a fourth editing function that receives and edits the second operation function.

Preferably, the event direction detector further includes a steady-state response processing unit, composed of a finite state machine, and an event driven processing unit; a shared unit that acts as an intermediary between the processing units; a fifth editing function that receives and edits operation specifications of the steady-state response processing unit, composed of a finite state machine, and the event driven processing unit; and a sixth editing function that receives and edits components of the shared unit that acts as an intermediary between the processing units.

Preferably, the event direction detector further includes a sub-block unit having a steady-state response processing unit composed of a finite state machine, an event driven processing unit, and a shared unit that acts as an intermediary between the processing units; a fifth editing function that receives and edits operations of the steady-state response processing unit and the event driven processing unit of the sub-block; and a sixth editing function that receives and edits components of the shared unit that acts as an intermediary between the processing units.

Preferably, a sub-block unit having a steady-state response processing unit composed of a finite state machine, an event driven processing unit, and a shared unit that acts as an intermediary between the processing units; the event direction detector further includes an input terminal via which control is received from the sub-block; holding means that holds an input value; a fifth editing function that receives and edits the input terminal via which control is received from the sub-block; and a sixth editing function that receives and edits an operation of the holding means that holds the input value.

Preferably, the event direction detector further includes holding means that holds a number of times an event is detected or contents of an event; and a fifth editing function that receives and edits an operation of the holding means that holds the number of times an event is detected and the contents of an event.

In a second aspect of the present invention, an event direction detector capable of an in-master/out-slave operation includes a feature that disables an external event in an initial state for the request output from a master side; a feature that, when triggered by the request output signal, enables an external event and receives response data; a first editing function that receives and edits an operation that disables the external event in the initial state for the request output from the master side; a second editing function that receives and edits an operation that, when triggered by the request output signal, enables the external event and receives the response data; a feature that enables an external event in the initial state for a request input to a slave side; a feature that, when triggered by the request input signal, disables an external event and sends response data; a third editing function that receives and edits an operation that enables the external event in the initial state for the request input to the slave side; and a fourth editing function that receives and edits an operation that, when triggered by the request input signal, disables the external event.

In a third aspect of the present invention, an event direction detector capable of an out-master/in-slave operation, includes a feature that disables an external event in an initial state for a request output from a master side; a feature that disables an external event regardless of the request output signal; a first editing function that receives and edits an operation that disables the external event in the initial state for the request output from the master side; a second editing function that receives and edits an operation that disables the external event regardless of the request output signal; a feature that enables an input of an external event in the initial state for a request input to a slave side; a feature that receives the request input signal; a third editing function that receives and edits an operation that enables the input of the external event in the initial state for the request input to the slave side; and a fourth editing function that receives and edits an operation that receives the request input signal.

Preferably, the event direction detector further includes a feature that connects multiple master blocks to one slave block and selectively receives events, sent from multiple event direction detectors on a side of multiple requesting masters, based on a predetermined procedure; and an editing function that receives and edits an operation that connects the multiple master blocks to one slave block and selectively receives events, sent from the multiple event direction detectors on the side of the multiple requesting masters, based on the predetermined procedure.

Preferably, the event direction detector further includes a feature that connects multiple master blocks to one slave block and selectively receives events, sent from multiple event direction detectors on a side of multiple requesting masters, by dynamically changing priority; and an editing function that receives and edits an operation description that connects the multiple master blocks to one slave block and selectively receives events, sent from the multiple event direction detectors on the side of the multiple requesting masters, by dynamically changing priority.

Preferably, the event direction detector further includes a feature that changes master/slave function divisions according to a predetermined procedure in a system; and an editing function that receives and edits an operation that changes the master/slave function divisions according to the predetermined procedure in the system.

Preferably, the event direction detector further includes a feature that dynamically changes master/slave function divisions according to information supplied from a source external to a system; and an editing function that receives and edits an operation that dynamically changes the master/slave function divisions according to the information supplied from the source external to the system.

In a fourth aspect of the present invention, an event direction detection method that distinguishes between an external event and an internal event and detects a direction of an event includes a first step of acting as an intermediary of an input/output of the external event and transferring an external event input to an external event output; a second step of acting as an intermediary of an input/output of the internal event and transferring an internal event input to an internal event output; a third step of transferring the outputs to a finite state machine of a block; a fourth step of receiving and editing an external event input terminal, via which the external event is input, and an external event output terminal via which the external event is output; a fifth step of receiving and editing the first step; a sixth step of receiving and editing an internal event input terminal, via which the internal event is input, and an internal event output terminal via which the internal event is output; and a seventh step of receiving and editing the second step.

In a fifth aspect of the present invention, an event direction detection method capable of an in-master/out-slave operation includes a first step of disabling an external event in an initial state for a request output from a master side; a second step of, when triggered by the request output signal, enabling an external event and receiving response data; a third step of receiving and editing an operation that disables the external event in the initial state for the request output from the master side; a fourth step of receiving and editing an operation that, when triggered by the request output signal, enables the external event and receives the response data; a fifth step of enabling an external event in the initial state for a request input to a slave side; a sixth step of, when triggered by the request input signal, disabling an external event and sending response data; a seventh step of receiving and editing an operation that enables the external event in the initial state for the request input to the slave side; and an eighth step of receiving and editing an operation that, when triggered by the request input signal, disabling the external event.

In a sixth aspect of the present invention, an event direction detection method capable of an out-master/in-slave operation includes a first step of disabling an external event in an initial state for a request output from a master side; a second step of disabling an external event regardless of the request output signal; a third step of receiving and editing an operation that disables the external event in the initial state for the request output from the master side; a fourth Step of receiving and editing an operation that disables the external event regardless of the request output signal; a fifth step of enabling an input of an external event in the initial state for a request input to a slave side; a sixth step of receiving the request input signal; a seventh step of receiving and editing an operation that enables the input of the external event in the initial state for the request input to the slave side; and an eighth step of receiving and editing an operation that receives the request input signal.

The present invention makes it possible to determine from which terminal a signal is input and thereby to detect the direction of an event.

All the sub-block models in the system have the same components, meaning that the parts can be shared. In addition, there is no need to re-write a model corresponding to the assignment after the system architecture is determined, that allows a consistent model structure to be used.

Multiple event direction detectors are grouped into one or into units of functions of the blocks to which an event is passed. This grouping allows operations on events sharable.

A received event can be passed not only in the "bucket brigade" method but in one of various methods most suitable at a particular time.

Even if a received event cannot be immediately processed for some reason, the event can be stored a finite number of times to postpone the processing. The order in which events are processed can be changed according to the importance of the stored events.

The so-called inter-block master/slave type communication, which is determined based on the direction of an event, can be implemented via the only one transmission path without adding a new transmission path.

Concurrent access from multiple master blocks to one slave block can be performed consistently.

Concurrent access from multiple master blocks to one slave block can be performed consistently while changing the connection order according to the dynamic determination of the conditions.

Master/slave function division switching via the same signal, for which system simulation cannot be conventionally performed at all, can be performed. That is, simulation can be performed for a functional block in which the block connection is dynamically changed, that is, in which a block acts as a master of another subordinate block at one time and, at the other time, as a slave subordinate to another block.

Master/slave function division switching via the same signal can be performed irrespective of the connection between blocks. That is, master/slave function division can be switched according to the dynamic determination of the conditions even when the connection between the blocks is fixed.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 27 is a diagram showing the real coding of a core part; and

DESCRIPTION OF THE PREFERRED EMBODIMENT

Notational Convention and Technical Term Definition

First, the following describes the notational convention and technical term definition used in this embodiment.

Figure 1:
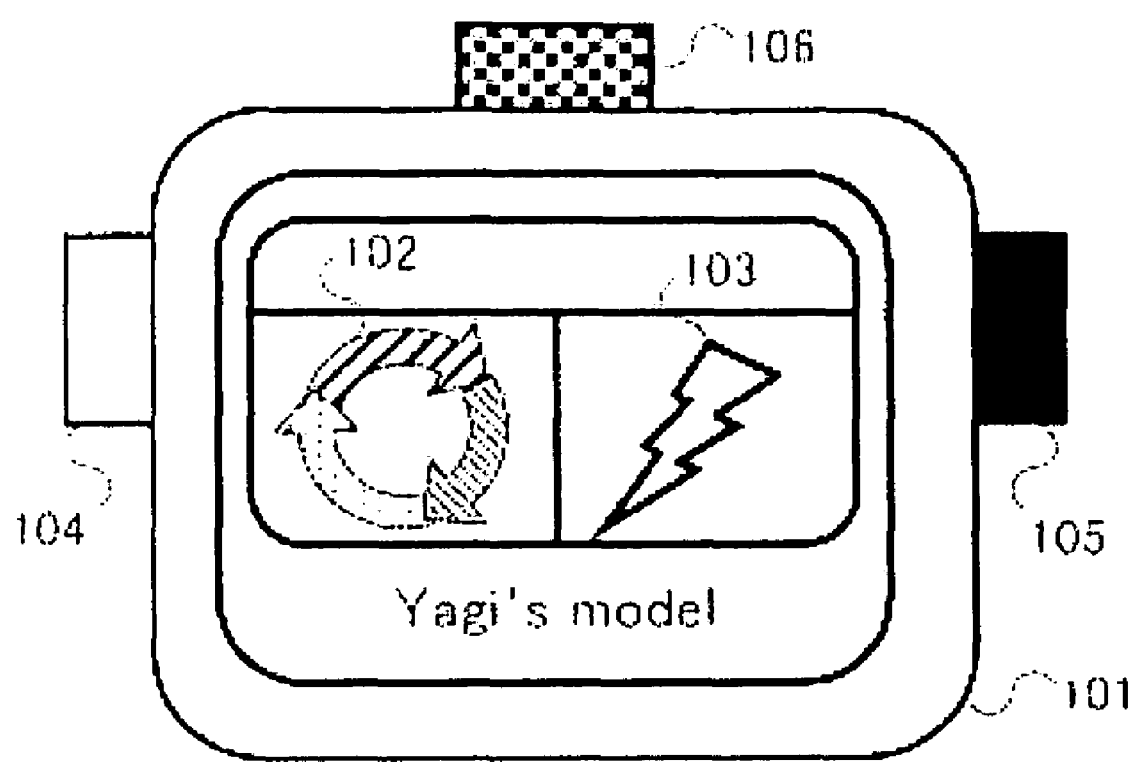
FIG. 1 is a diagram showing the concept of a model structure used in the present invention.

FIG. 1 is a diagram showing the notational convention of a model used in this embodiment.

As shown in FIG. 1, a model 101 includes a Finite State Machine part (hereinafter called an FSM) 102 in the steady state and an Event Driven Processing unit (hereinafter called an EDP) 103. The FSM 102 and the EDP 103 are linked each other via shared variables in the block.

The model has ports that are parts via which communication is made with external blocks. The ports are classified into the following types according to the master/slave relation between the action of the block and the action of another block connected via the port. One type of port is a slave port 104 that "depends on the action of another block". This port is indicated as a white terminal in the figure. Another type of port is a master port 105 that "governs the action of another block". This port is indicated as a block port in the figure.

A still another type of port, called a mutual port 106 "whose master/slave relation is not (or cannot be) determined", is also defined. This port is indicated as a checkered pattern in the figure.

In this embodiment, an event and an event with data (signal) are not distinguished but are called generically as events. This is because there is no need to distinguish between an event with data and an event without data in the present invention unless otherwise stated but is applicable to both.

[Embodiment of Event Direction Detector as a Part]

Figure 2:
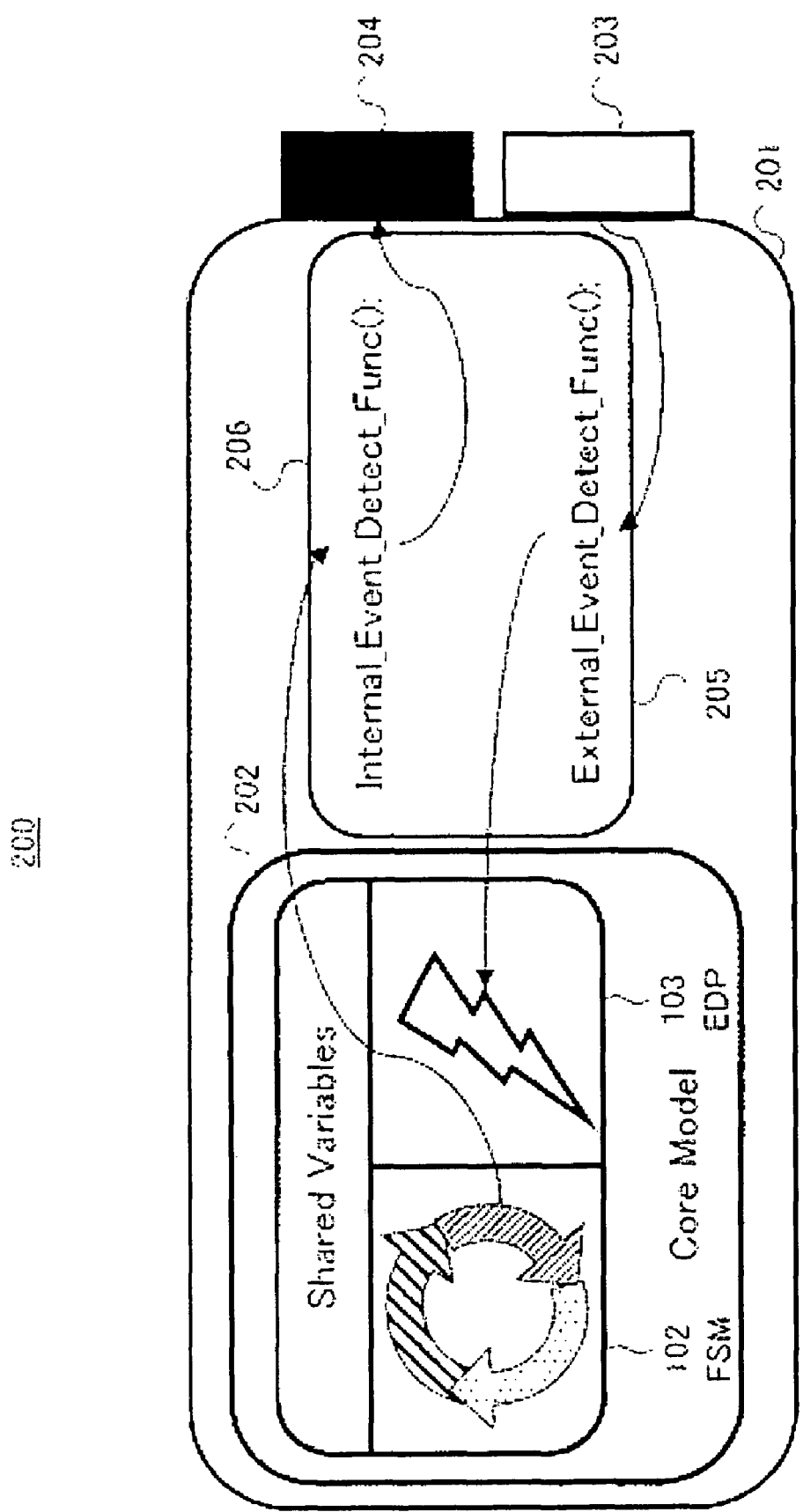
FIG. 2 is a diagram showing the concept of a simplified event direction detector that is a model of the present invention.

FIG. 2 is a diagram showing an example of the configuration of a system that includes an event direction detector in an embodiment of the present invention.

In an event direction detector 200, a block 201 includes an operation model (hereinafter called a core model) 202 of the block, a slave port 203, and a master port 204, as shown in FIG. 2.

An external event sent to the block 201 via the slave port 203 is checked by an external event detection function 205. If determined as an external event, the external event is transferred to the EDP 103 of the core model 202.

An internal event sent from the FSM 102 of the core model 202 is checked by an internal event detection function 206. If determined as an internal event, the internal event is transferred to the EDP of the core model 202 or sent to an external block via the master port 204.

Alternatively, if there is no need for the model to recognize that the event is an internal event, the internal event detection function 206 may also be bypassed and, in this case, the internal event is sent to an external block directly via the master port 204.

The event direction detector 200, implemented as an in-block shared function, can be called by both the FSM 102 and the EDP 103. The internal operation of the model (whether an internal event should be considered or the model is activated by an external event) is determined not by the event direction detector but by the model creator.

That is, this model is characterized in that an incorrect operation description, if coded, results in an incorrect operation but does not support the correction of incorrect descriptions. The present invention allows the user to detect the direction of an event.

Figure 3:
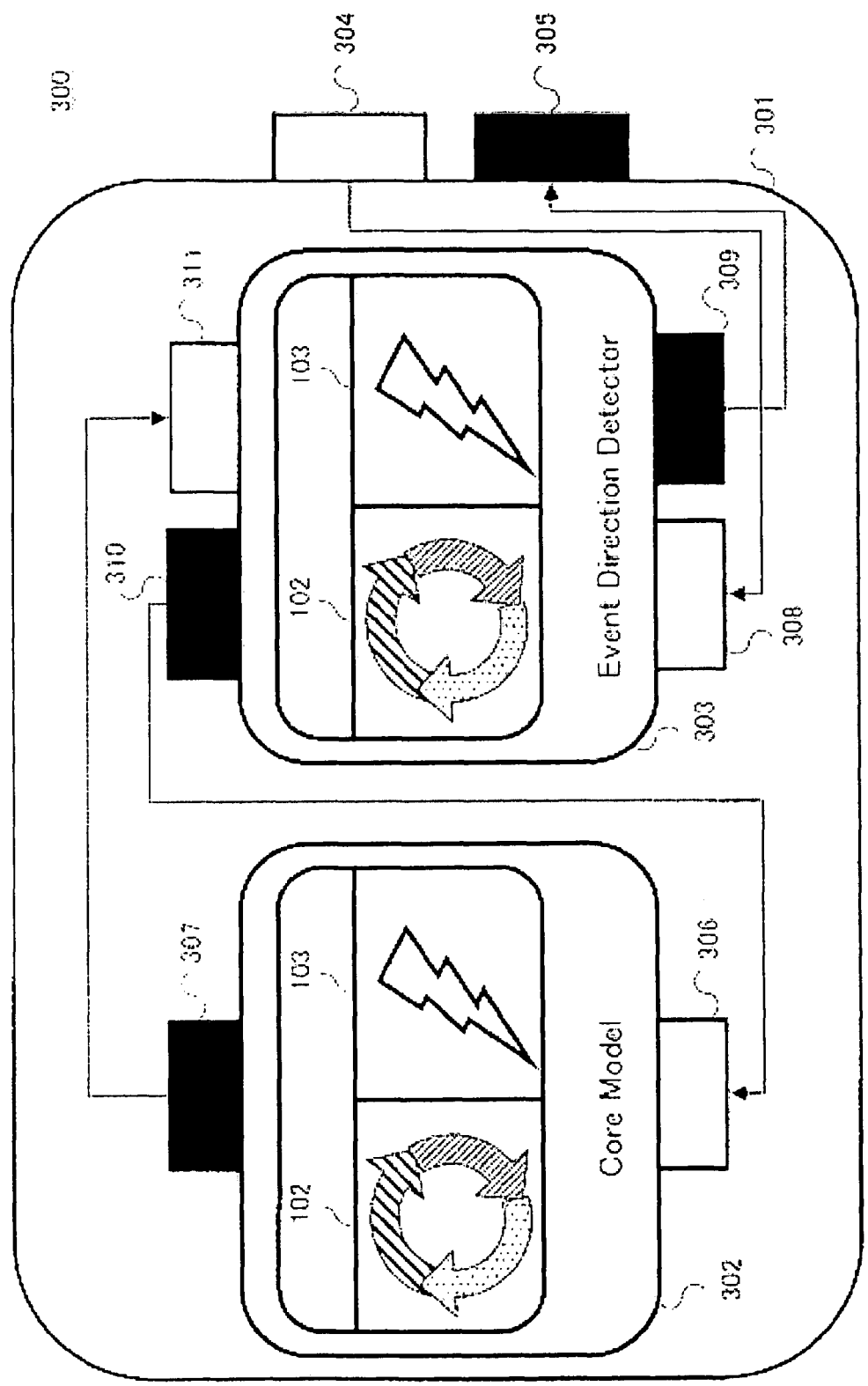
FIG. 3 is a diagram showing the concept of the basic form of a sub-blocked event direction detector that is a model of the present invention.

FIG. 3 is a diagram showing an example of the configuration of a sub-blocked event direction detector 300 in this embodiment and showing an example of the configuration of a system that includes the event direction detectors having the same modeling configuration.

As shown in FIG. 3, a block 301 includes a core model 302 of the block, an Event Direction Detection sub-block (hereinafter called an EDD) 303, a slave port 304, and a master port 305.

An external event sent to the block 301 via the slave port 304 propagates to an external event input slave port 308 of the EDD 303. This external event starts the EDP 103 of the operation model of the EDD 303 and the event is processed according to the operation description of the EDP 103.

If the operation of the EDP 103 can propagate to a core model 302 of the block 301, this event propagates to a slave port 306 of the core model via an external event output master port 310 of the EDD 303.

An internal event is generated by the core model 302 and is propagated to an internal event input slave port 311 of the EDD 303 via an internal event output master port 307 of the core model 302.

This internal event starts the EDP 103 of the operation model of the EDD 303 and is processed according to the operation description of the EDP 103. If the operation of the EDP 103 requests that the internal event be propagated internally, the internal event is further propagated to the slave port 306 of the core model.

Referring to FIG. 3, the core model 302 has only one slave port 306, indicating that the core model receives an internal event and an external event with no distinction. The designer must be careful about this configuration because this configuration sometimes causes an endless loop in the model.

To distinguish between an internal event and an external event, the core model 302 must have a slave port for an external event and a slave port for an internal event and, similarly, the EDD 303 must have a master port for an external event and a master port for an internal event.

In addition, the event transmission times can also be controlled. If an event processed by the EDD 303 is processed only by the EDP 103 of the EDD 303, the procedure becomes highly responsive.

A modification is also possible in which the EDP 103 of the EDD 303 only changes the state variable, provided for controlling the FSM 102 of the EDD 303, to allow the FSM to perform large-scale processing not suitable for processing by the EDP 103. This modification requires some special mechanism, for example, to process multiple interrupts consistently. In this case, too, the present invention does not support the error analysis of the model and, so, the designer must be careful about all operations. The present invention makes the EDD a sharable part and available for use as a template.

Figure 4:
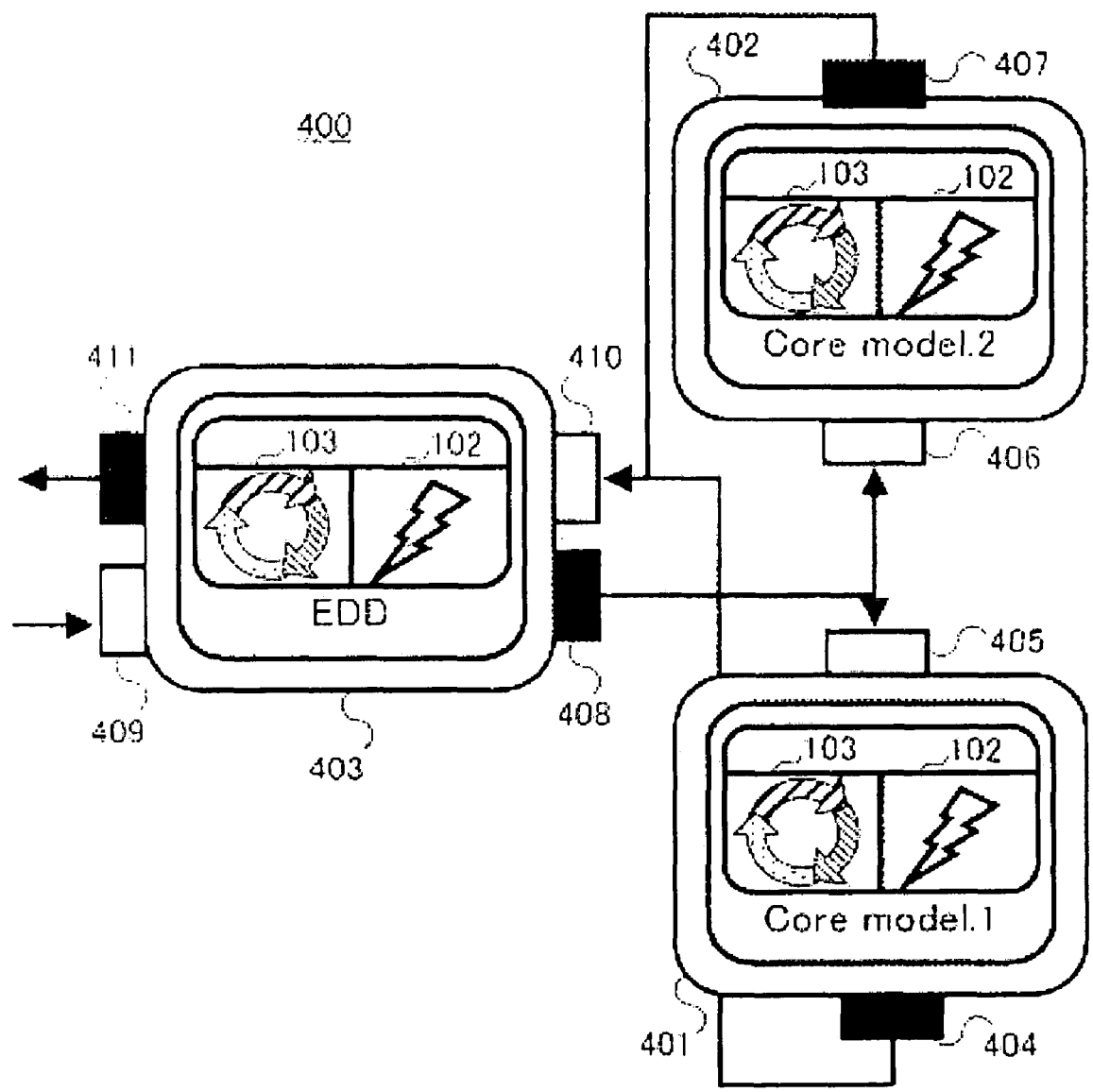
FIG. 4 is a diagram showing an example of the configuration of a multi-master/multi-slave system.

FIG. 4 is a diagram showing a shared-blocked event direction detector 400 in this embodiment. The figure shows one embodiment of a multi-master/multi-slave system including a block 401 and a block 402, which are independent to each other, and a shared EDD 403. For simplicity, both the block 401 and the block 402 are assumed to be slave blocks in the example in the figure.

In the configuration shown in FIG. 4, there are two modes of output from the EDD 403 to the block 401 or the block 402: one is a one-to-many broadcast and the other is a one-to-one individual transmission. The following describes the broadcast mode.

An external event received via a slave port 409 of the EDD 403 propagates to the EDP of the EDD. This event is output from an external event output master port 408 of the EDD 403 according to the operation description of the EDP of the EDD 403 and is propagated to slave ports 405 and 406 of, the block 401 and the block 402 respectively.

In this case, the EDP 103 of each block can select this external event according to the value of a block variable. For example, if the processing is switched based on a saved address, the EDD in this embodiment can be used, for example, as a model of the bus architecture.

In this case, an event without a value requires a procedure for writing an address into the block 401 or block 402. An event with a value (signal) can use an address as an event value. Although the EDD 403 can have the coordination mechanism in this case, the designer must guarantee its logic. This configuration allows the same EDD to be shared on a function basis.

Similarly, to detect an internal event, an internal event output from a master port 404 of the block 401 or a master port 407 of the block 402 is received by an internal event input port 410 of the EDD 403. The received internal event is propagated internally or externally via an internal event output port 411 according to the internal operation description. As shown in this embodiment, the number of masters need not be equal to the number of slaves in the system.

Figure 5:
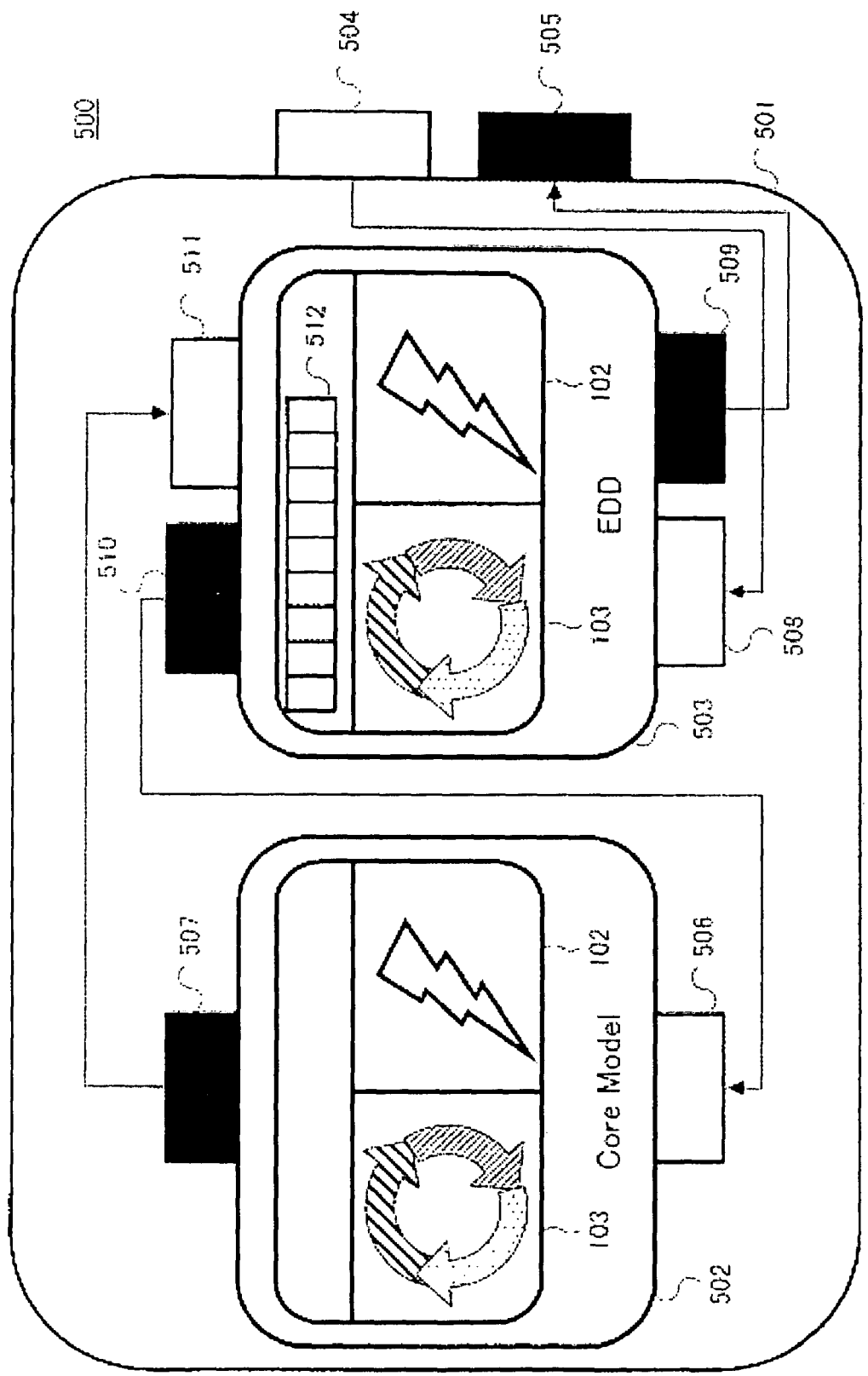
FIG. 5 is a diagram showing an example of a system configuration in which the event direction detector with an event queue feature is used.

FIG. 5 is a diagram showing an example of the configuration of a queue-feature equipped event direction detector 500 in this embodiment.

In the example of the configuration shown in FIG. 5, a block 501 has a core model 502, and an EDD 503 detects an event direction. An external event propagated via an external event slave port 504 is detected by an external event input slave port 508 of the EDD 503 and is stored in a queue array 512 configured in the shared variable area of the FSM 102 and the EDP 103 of the EDD 503 according to the operation description of the EDP 103 of the EDD 503.

The events stored in the queue array 512 are processed by the FSM 102 of the EDD 503 and, after being rearranged as necessary, are sequentially propagated to a slave port 506 of the core model 502 via an external event output master port 510.

An internal event is output from an internal event output master port 507 of the core model 502 and is propagated to the EDP 103 of the EDD 503 via the an internal event input port 511 of the EDD 503.

In this case, too, the internal events are stored in the queue array 512 configured in the shared variable area of the FSM 102 and the EDP 103 of the EDD 503 and are processed by the FSM 102 of the EDD 503.

How to process an internal event depends on the designer and, usually, the logic for avoiding an endless loop must be introduced. To propagate an internal event to a location outside the block, the internal event is sent from a block master port 505 to an external location via an internal event output master port terminal 509 of the EDD 503.

The individual parts of the embodiment of the present invention have been described above.

The present invention will become more apparent by describing non-limited embodiments of a system and by referring to the drawings.

Embodiments of System

Embodiments of the present invention will be described with reference to the drawings.
<In-Master/Out-Slave Device>
[Description of Modeling an Algorithm as an Electronic System]

An algorithm is usually described with control flows and operations. In this case, an algorithm is usually designed without clearly separating between control flows and operations. That is, when an algorithm is designed, it is a rare case that a predetermined degree of operation granularity is maintained, the control structure is excluded, and parallel and concurrent execution on which an electronic system is based is considered.

Therefore, the first step to the creation of a model of an electronic system is to divide the algorithm into blocks to introduce granularity of computation. When the algorithm is divided into blocks, the minimum unit is usually a function; that is, function processing must be modeled as an electronic system.

Some functions return values when called, but others do not. In general, this difference is whether or not some value is returned to the calling side after the function procedure is executed. The implementation method of returning a value, which depends on the processing system, is not described here because a detailed description is outside the scope of this invention. Because an algorithm function call is used so frequently and the designer issues a call with no particular concern for the signal direction, a control transmission path is not identified in many cases. Nevertheless, there is always a control transmission path from a calling side to a function.

Figure 6:
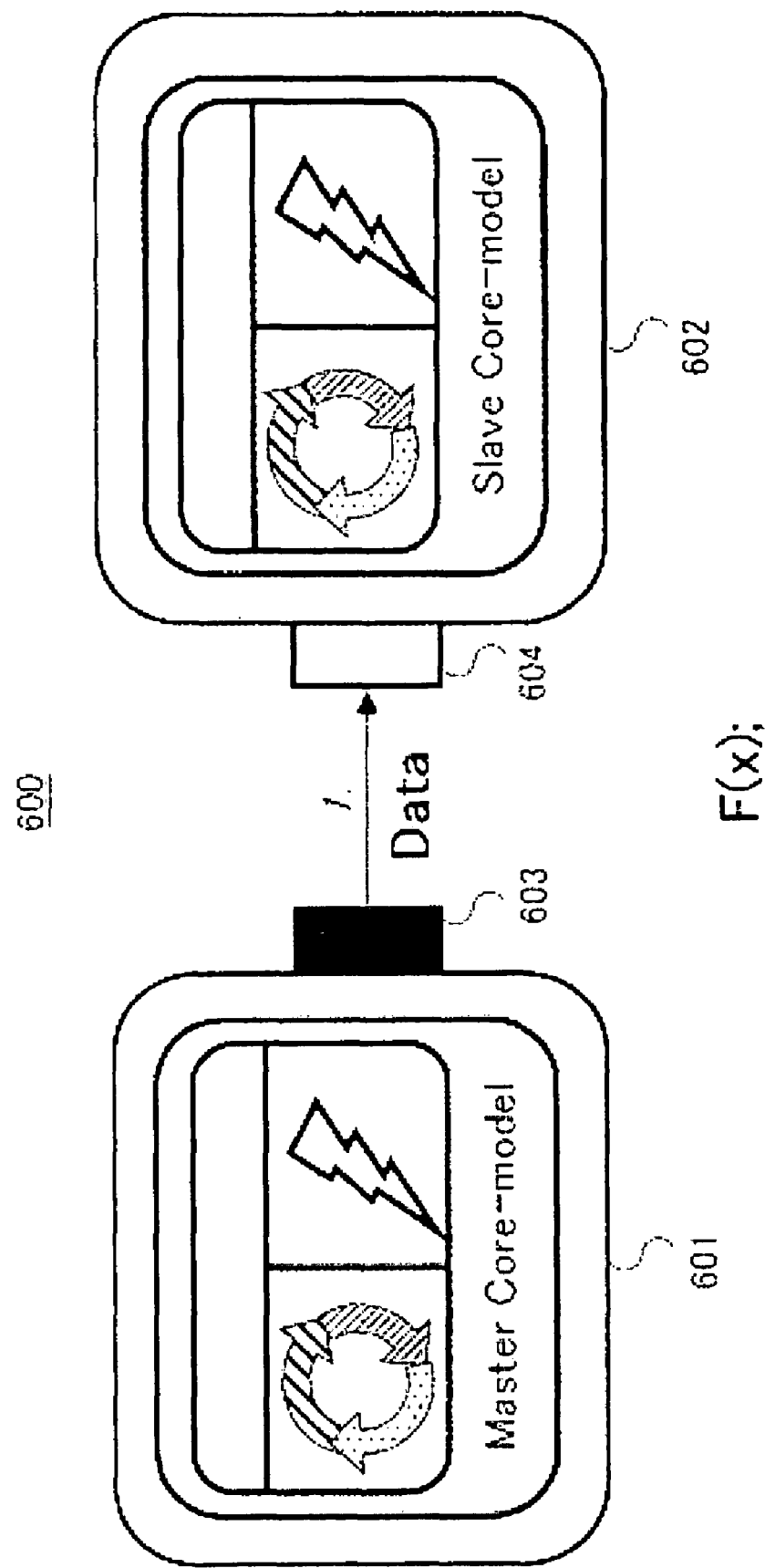
FIG. 6 is a diagram showing the concept of a model of a function call with no return value.

FIG. 6 is a diagram showing an example of an electronic system model 600 of a C-coded function call with no return value.

In this electronic system model 600, the calling side (that is, master side) block 601 is connected, via a master port 603 and a slave port 604, to a function (that is, slave side) block 602 that executes the processing F(x).

Because the argument (data) is explicitly connected as a port in most cases, the master port 603 and the slave port 604 are ports via which the data x is passed. In this case, the request signal from the calling side, which is passed in the same direction as the data, is implicitly connected as an event with data. That is, the master port 603 and the slave port 604 are modeled in an electronic system as a signal generated by adding the value of the data x to the calling request event.

Figure 7:
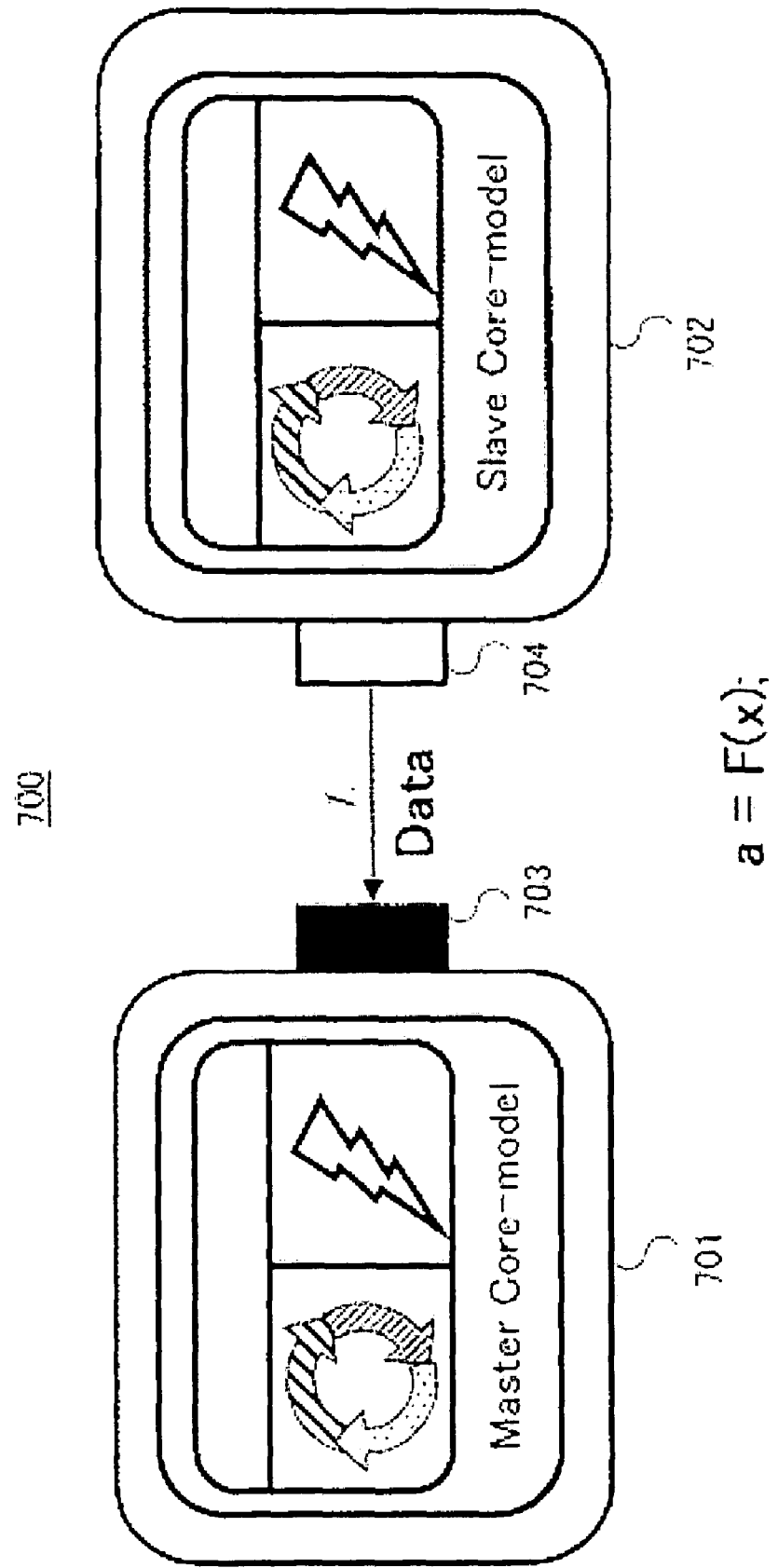
FIG. 7 is a diagram showing the concept of a model of a function call with a return value.

FIG. 7 is a diagram showing an example of an electronic system model 700 of a C-coded function call with a return value.

In this electronic system model 700, the calling side (that is, master side) block 701 is connected, via a master port 703 and a slave port 704, to a function (that is, slave side) block 702 that executes the processing F(x). The argument (data) is explicitly connected as a port as in the function call with no return value.

The return value 'a' must be connected explicitly and, in this case, the return value is propagated via the master port 703 and the slave port 704.

There is no explicit calling event request signal in the electronic system model 700. Therefore, the model cannot be run without a trick. In some simulation systems (for example, N2C simulator from CoWare Inc. or System C simulator with master/slave library environment), the master/slave concept can be directly introduced and explicitly provided to execute a calling event transparently. However, because its internal operation is executed by a remote procedure call that allows the master side to directly call the slave operation function on the slave side, the inter-block communication cannot be observed during a simulation and therefore the designer cannot understand the logic of the communication.

Figure 8:
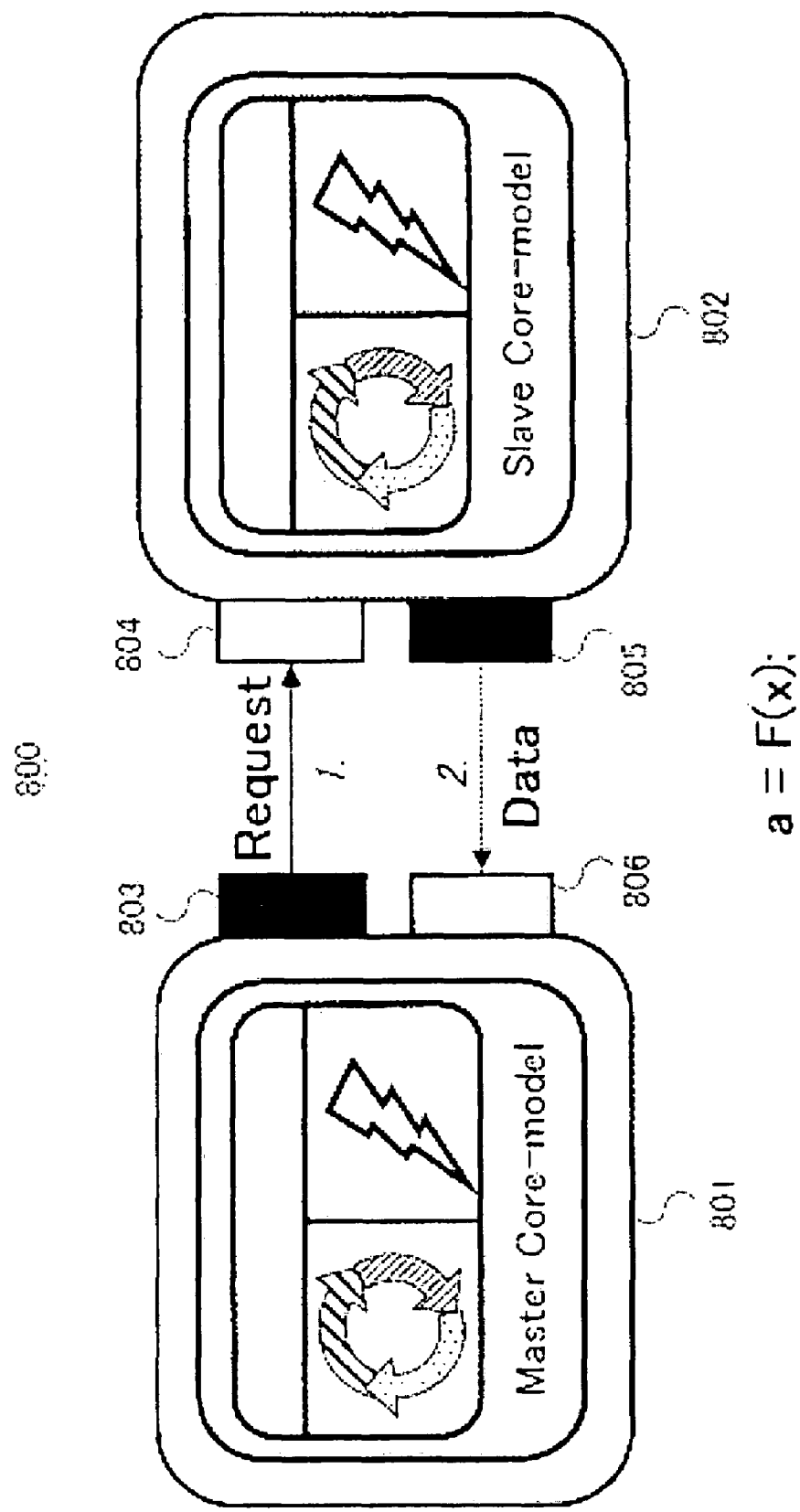
FIG. 8 is a diagram showing the concept of a model of a function call with a return value where a control signal and data are separated.

FIG. 8 is a diagram showing an example of an electronic system 800 of a function call with a return value to which a request signal is explicitly attached.

In this case, a function call from a calling side 801 is output from a master port 803 and is input to a slave port 804 of a function side 802. After the function processing, the return value 'a' is output from a master port 805 of the function side and is input to a slave port 806 of the calling side 801. The description of the argument x is omitted here.

In this case, the operation logic is clear because the control flow and the data flow are separated and the signal direction is always the master-out/slave-in relation. Therefore, the master/slave concept need not be introduced but the sender/receiver relation, which is the most basic communication mode, can be used.

In general, system-level design language, for example, SystemC or SpecC, employs this communication feature. In this case, however, there is a need to rewrite a function call procedure to explicitly specify the control signal as an argument of the function call. Thus, an algorithm cannot be directly replaced by an electronic system model.

In other words, the creation of an electronic system model in this embodiment requires, in all function calls in the algorithm, that a control flow (a calling request event) be defined as a variable and the defined variable be added to the arguments for passing it to the function and that, in the function, the return value (data) that is written back be redefined as an argument or some other form. When an optimum electronic system architecture is determined while switching between hardware processing and software processing, the abstraction level of this model is too low and, when the block is assigned to software, another wasteful step is required for returning control back to the calling side.

Another problem is a difference between an algorithm and an electronic system in the behavior performed in response to an input value. For example, the same operation is performed in an algorithm when the same value as that of the previous input is input to the same function, while no operation may be performed in an electronic system depending upon the system specification unless a block start event is explicitly issued if the input to the block does not change. In this case, the request signal must be explicitly added and so the same problem described above arises.

[Solution]

Figure 9:
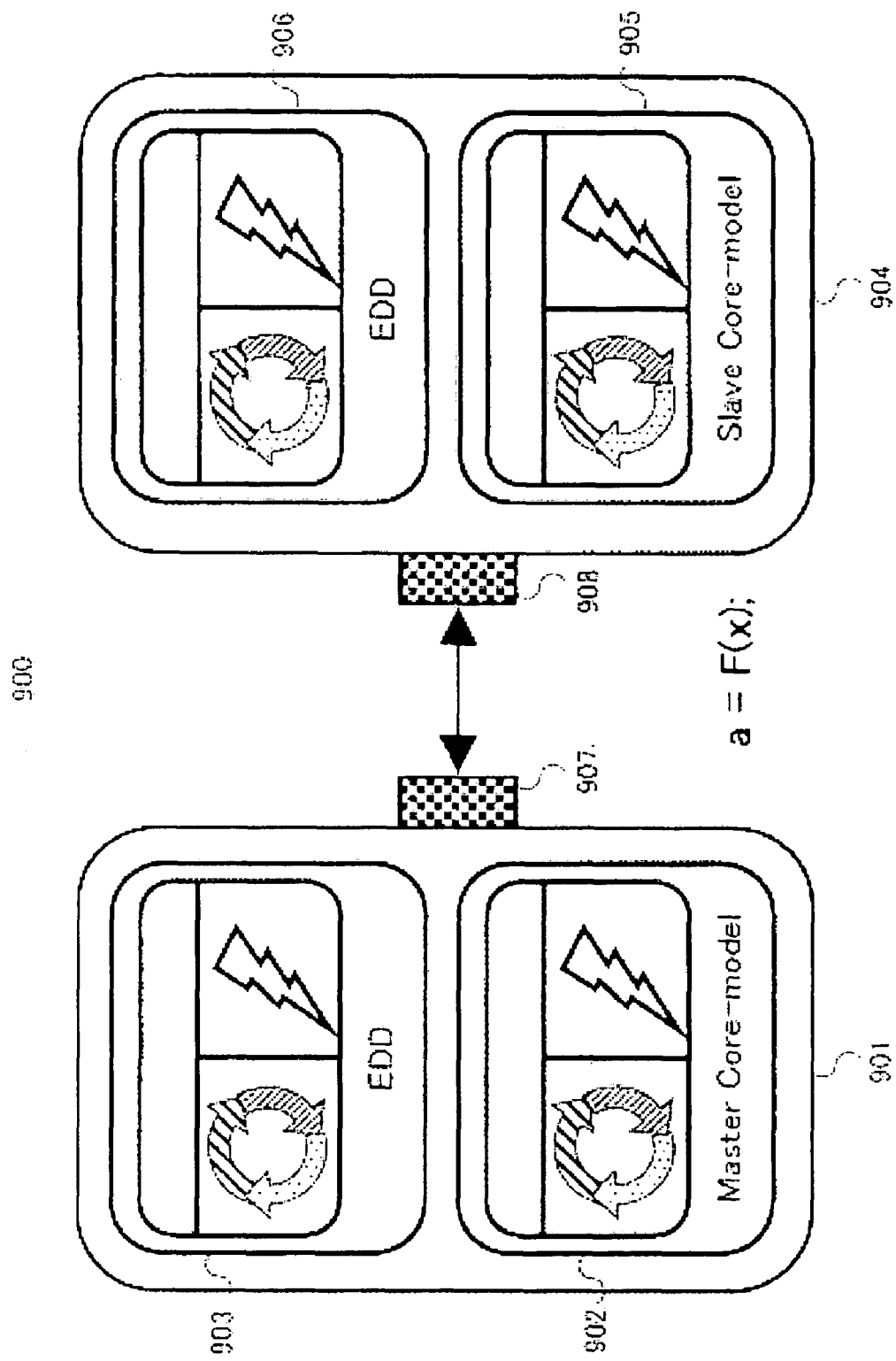
FIG. 9 is a diagram showing an example of the system configuration of an in-master/out-slave model.
Figure 10:
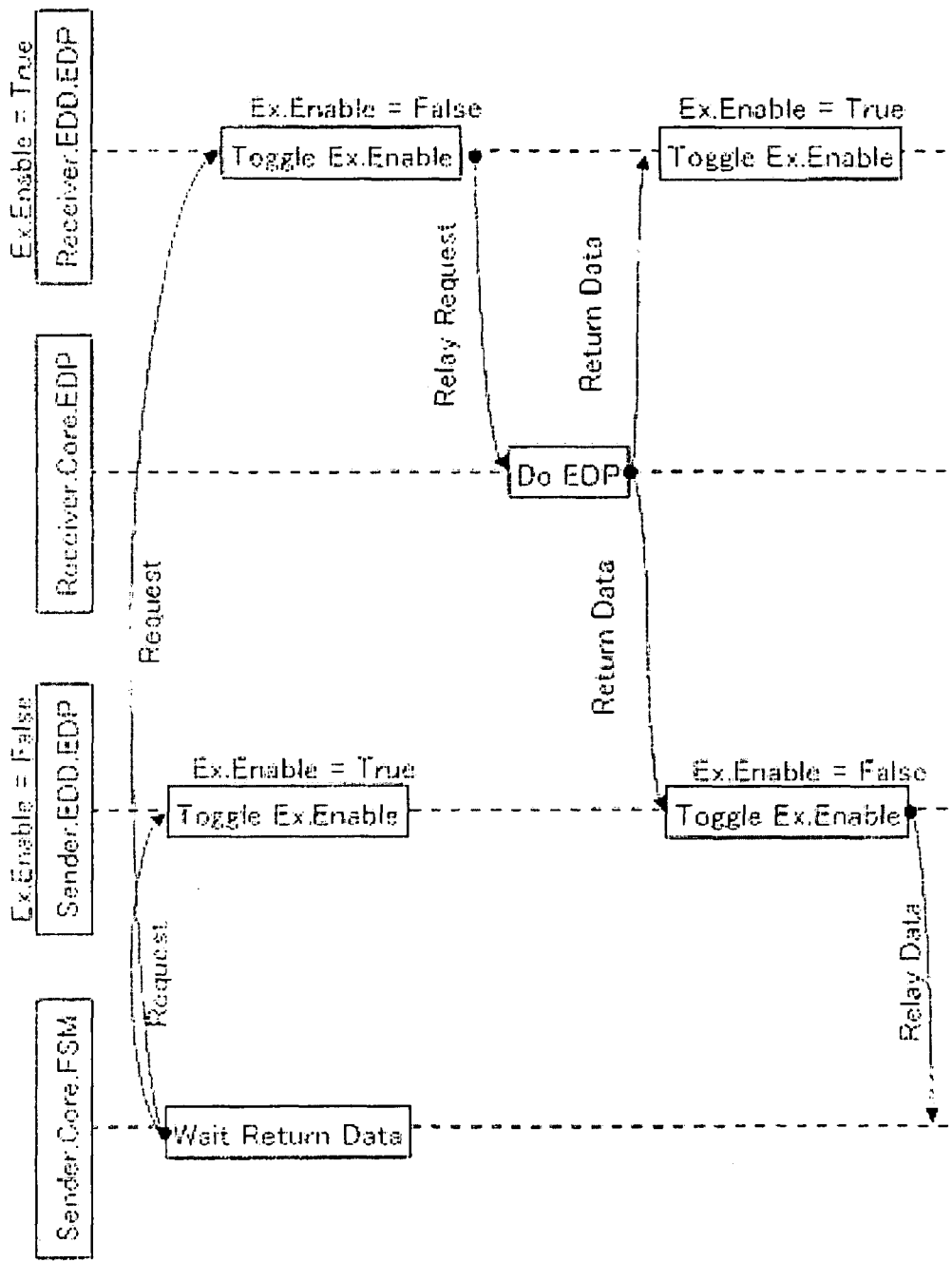
FIG. 10 is a diagram showing the sequence of the in-master/out-slave model.

FIG. 9 is a diagram showing an example of an in-master/out-slave model 900 that uses the EDD in this embodiment. FIG. 10 is a general sequence diagram showing the in-master/out-slave operation in the example shown in FIG. 9.

A calling (sender) side block 901, which includes a core model 902 and an EDD 903, is connected to a core model 905 and an EDD 906 of a function (receiver) side block 904 via checker-patterned mutual ports 907 and 908 of the blocks.

Initially, the propagation enable of an external event input of the calling-side EDD 903 is false, and the propagation enable of an external event input of the function-side EDD 906 is true.

A calling request event sent from the calling side block 901 is propagated to both the EDD 903 of the calling side block 901 and the EDD 906 of the function side block 904, and the FSM of the calling-side core model 902 waits for a return value.

The EDD 903 does not perform an internal feedback because the propagation enable is false, and the propagation enable is updated to true by this function calling request event. On the other hand, because the propagation enable is true in the EDD 906, the EDD 906 relays the event to the EDP of the core model 905 on the function 904 side. At the same time, the propagation enable of the EDD 906 is updated to false by this event.

After the processing according to the operation description is performed in the EDP of the core model 905, the return value is returned to the EDD 903 and the EDD 906. The EDD 906 does not perform an internal feedback because the propagation enable is false, and the propagation enable is updated to true by this event. Because the propagation enable is true in the EDD 903, the EDD 903 relays the return value to the FSM of the calling-side core model 902.

When the procedure described above is executed, the return value processed by function calling is passed to the calling side and the propagation enable state is returned to the initial state.

[Description of Distinction Between an External Event and an Internal Event]

There are two types of events: internal events and external events. In general, the events are distinguished at the algorithm level, but not in an electronic system. This distinction, often required from the result of model analysis using UML, will be used more often in future in the system-level design. This distinction is one of element technologies of an electronic system model.

Figure 11:
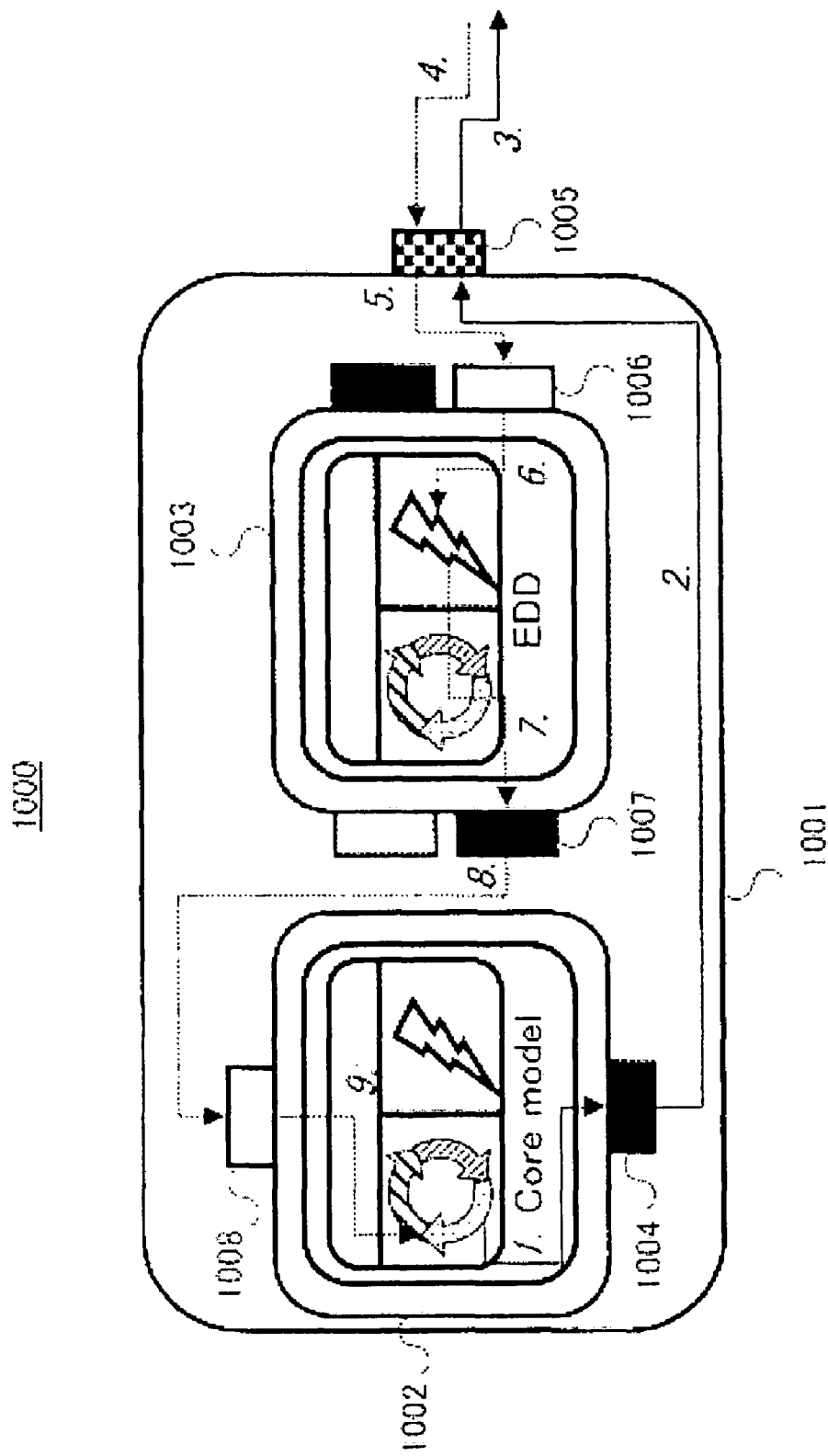
FIG. 11 is a diagram showing an example of the configuration of an in-master model that generates an external event.
Figure 12:
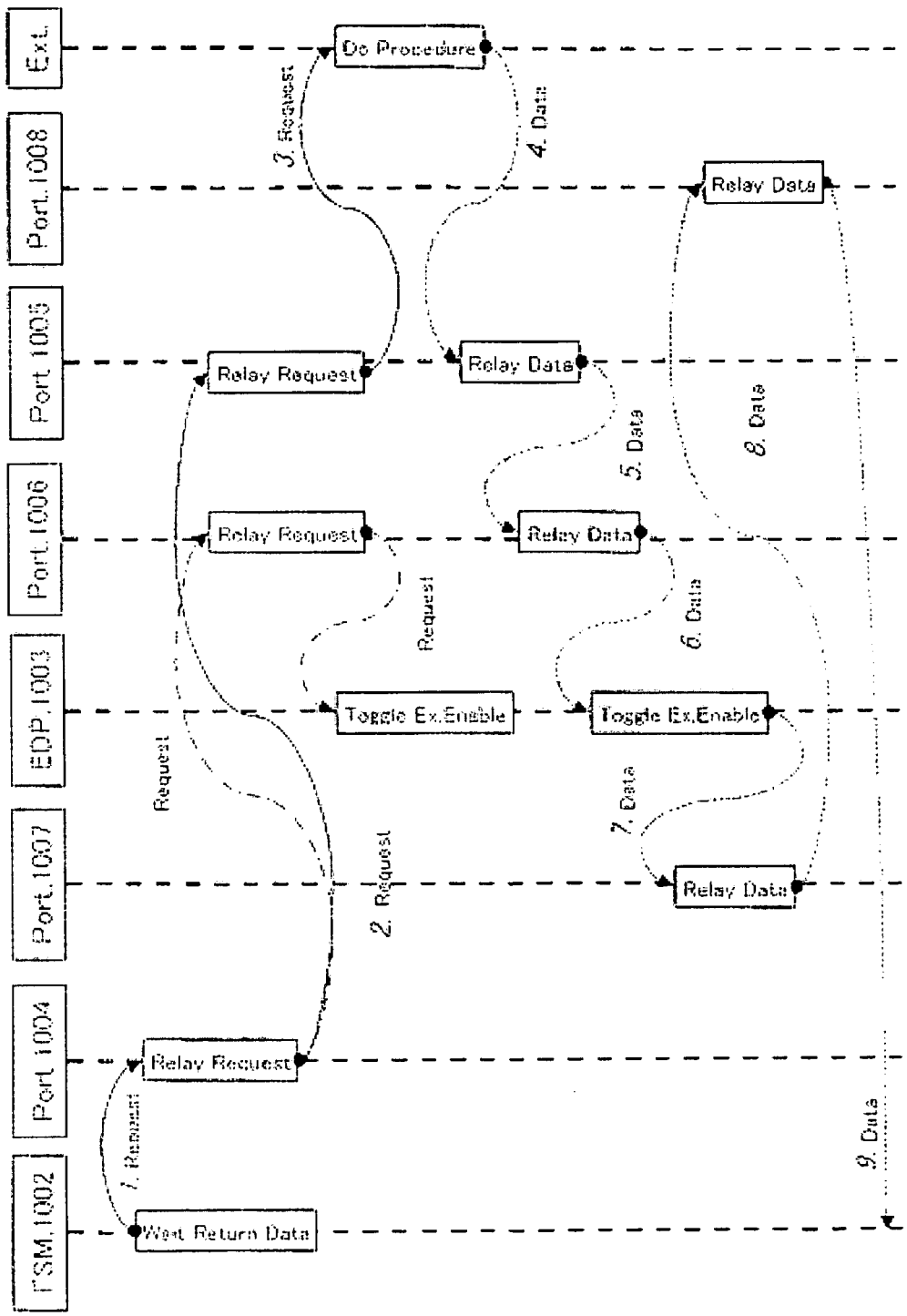
FIG. 12 is a diagram showing the sequence of the in-master model that generates an external event.

FIG. 11 is a diagram showing an example of a model 1000 of an in-master unit that sends an external event. FIG. 12 is a detailed sequence diagram of the example shown in FIG. 11.

In the model 1000, an in-master unit 1001, which includes a core model 1002 and an EDD 1003, sends a signal via a mutual port 1005.

In the description below, the number in parentheses indicates a sequence number.

A calling request event, sent from the FSM of the core model 1002, is sent via a master port 1004 (1) to a port 1006 and the port 1005 (2). The request event received via the port 1006 is propagated to the EDP of the EDD 1003 and its propagation enable is updated to true.

At the same time, the request event received via the mutual port 1005 is propagated to an external slave side block (3).

After appropriate processing is performed for the request event transmitted externally, its return value data is input to the mutual port 1005 (4). The data is further propagated via the slave port 1006 of the EDD 1003 (5) to the EDP of the EDD 1003 (6).

The output data is relayed, via a master port 1007 of the EDD 1003 (7), to a slave port 1008 (8) of the core model 1002, and then returns to the FSM of the core model 1002 (9).

Figure 13:
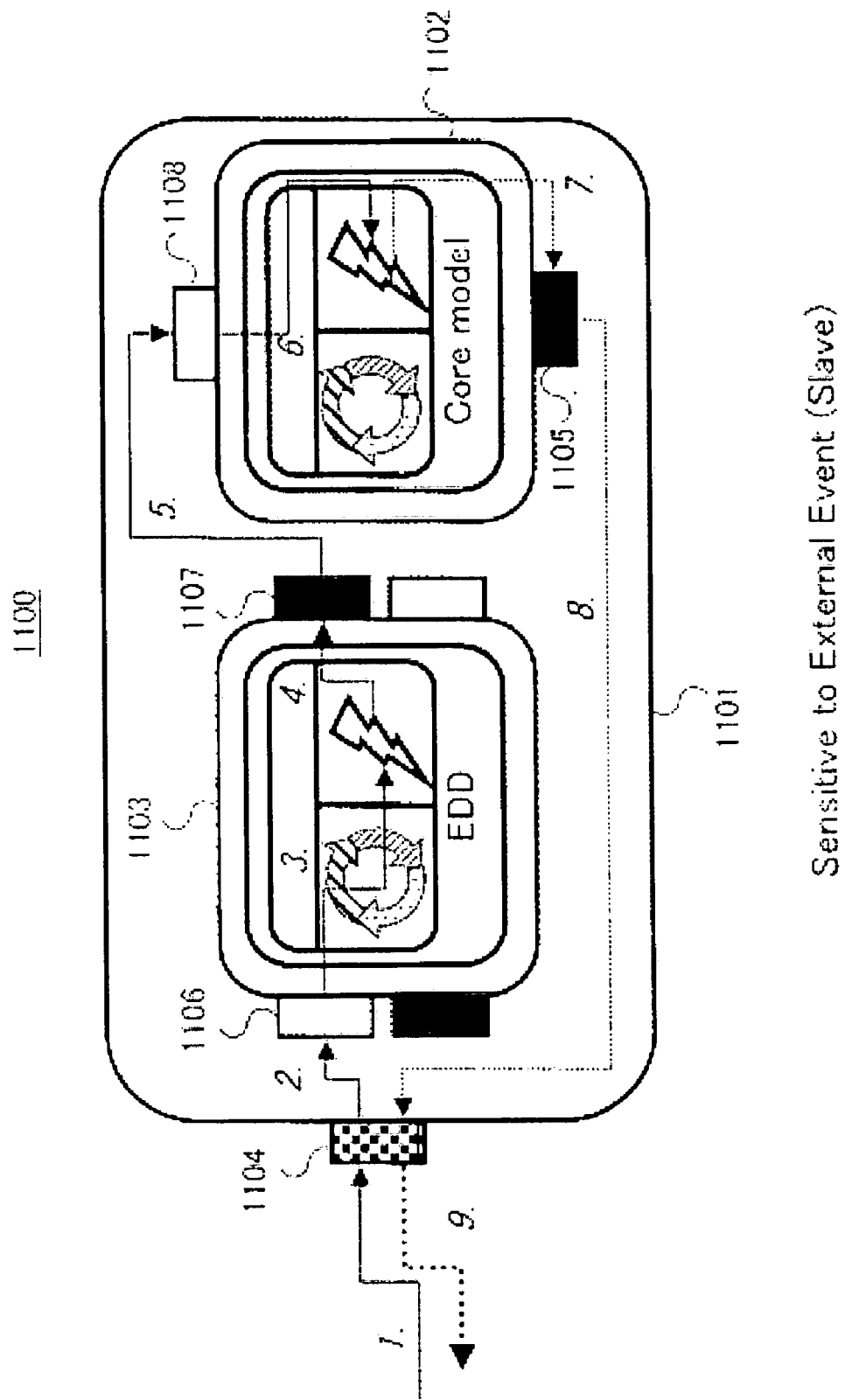
FIG. 13 is a diagram showing an example of the configuration of an out-slave model that detects an external event.
Figure 14:
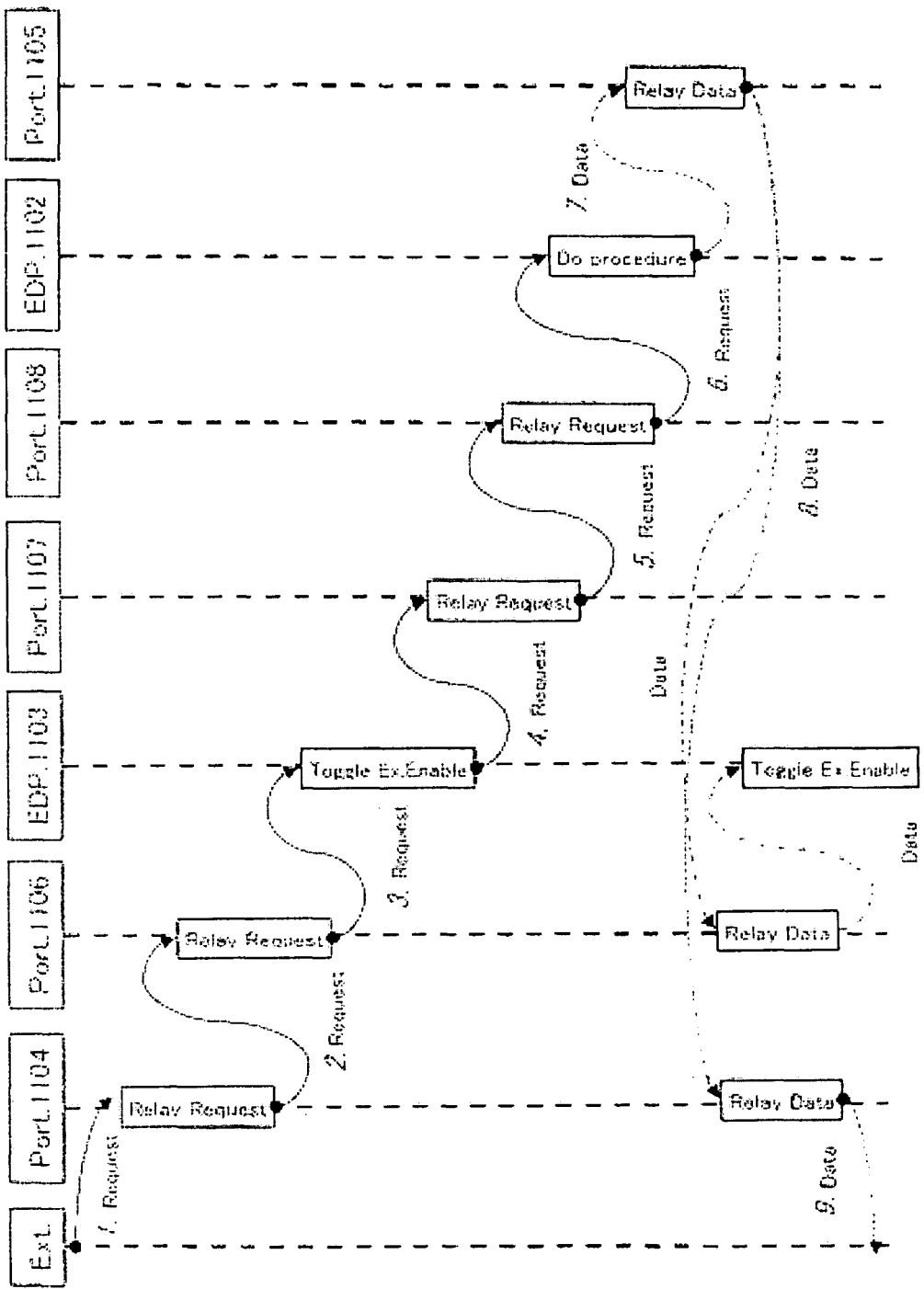
FIG. 14 is a diagram showing the sequence of the out-slave model that detects an external event.

FIG. 13 is a diagram showing an example of the model 1000 of an out-slave unit activated by an external event. FIG. 14 is a detailed sequence diagram of the example shown in FIG. 13.

Referring to FIG. 13, an out-slave block model 1101, which includes a mutual port 1104, is activated by an event received from an external source. The operation description of this model is described in a core model 1102, and the model further includes an EDD 1103.

As in the example described above, the number in parentheses indicates a sequence number.

An external event request received from the mutual port 1104 is propagated via the port 1104 (1) to the inside of the model (2). The propagated request is passed from an external event input port 1106 of the EDD 1103 to the EDP of the EDD 1103 (3). Because the initial state of the propagation enable of the EDP is true, this request updates the propagation enable to false and, in addition, the request is relayed via a master port 1107 of the EDD 1103 (4) to a slave port 1108 of the core model (5).

The request received via the port 1108 (6) is processed by the EDP of the core model 1102 (7) and is sent from a master port 1105 of the core model (8). This data is propagated also to the EDP of the EDD 1103 via a slave port 1106 of the EDD 1103 to update the propagation enable, which is false, to the initial state (true). At the same time, the data is sent to an external block via the external port 1104 (9).

Figure 15:
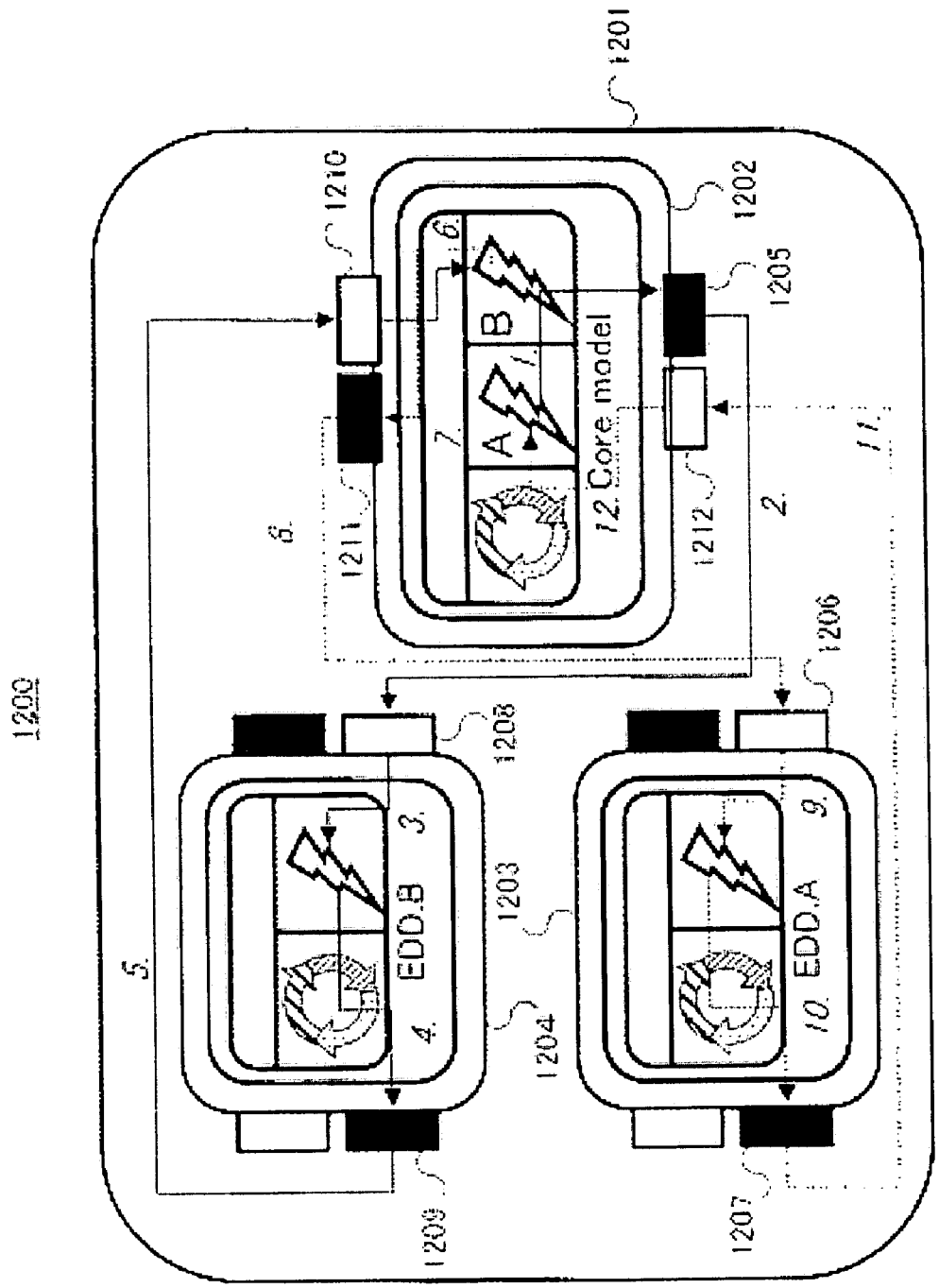
FIG. 15 is a diagram showing an example of the configuration of a slave model that detects an internal event.
Figure 16:
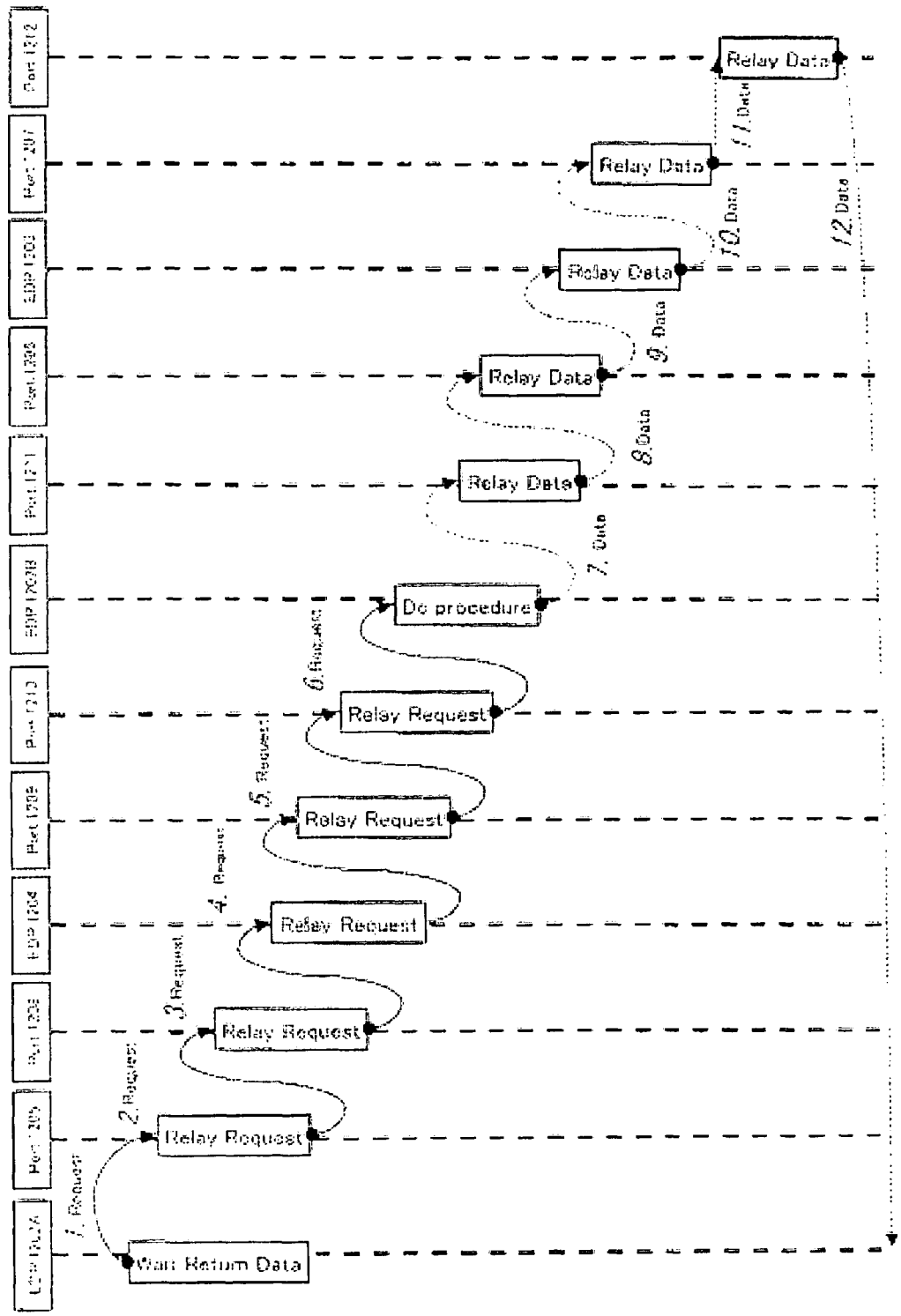
FIG. 16 is a diagram showing the sequence of the slave model that detects an internal event.

FIG. 15 is a diagram showing an example of a slave model 1200 in which an internal event and an external event are clearly distinguished and which is activated by an internal event. In this case, an action that will be performed after an internal event is detected (for example, data is output) is not defined. FIG. 16 is a detailed sequence diagram of the example shown in FIG. 15.

In this case, an internal event and an external event are clearly distinguished in a block model 1201, and the action that will be performed when the block is activated depends on which type of event, internal or external, activates this block. For this reason, a core model 1202 has two EDPs: EDP 1202A and EDP 1202B. The event direction of each of those EDPs is detected respectively by the dedicated EDD, that is, EDDA 1203 and EDDB 1204.

In this example, when the model 1201 receives an event from an external block, the EDP 1202A is started to generate an internal event.

A request event generated by the EDP 1202A is propagated via a master port 1205 of the core model (1) to a slave port 1208 of the EDDB 1204 provided for an internal event (2). The request event is propagated to the EDP of the EDDB 1204 (3) and, via a master port 1209 of the EDDB 1204 (4), is output (5) and propagated via a slave port 1210 of the core model to the EDP 1202B provided for an internal event of the core model (6).

After the processing of the EDP 1202B, the return value is propagated via a dedicated master port 1211 (7) to a slave port 1206 of EDDA (8). In addition, the return value is propagated to the EDP of the EDDA 1203 (9), is processed there (10), is output from an internal event master port 1207 of the EDDA 1203 and, via a slave port 1212 of the core model (11), is returned to the EDP 1202A (12).

Although the switching feature of the EDD is omitted in the propagation path in this example because there is no signal conflict, a flip-flop feature or condition determination configuration such as the one explained with FIGS. 9 and 10 is used as necessary to introduce an appropriate conflict prevention feature.

[Internal Event Including a Recursive Call]

Figure 17:
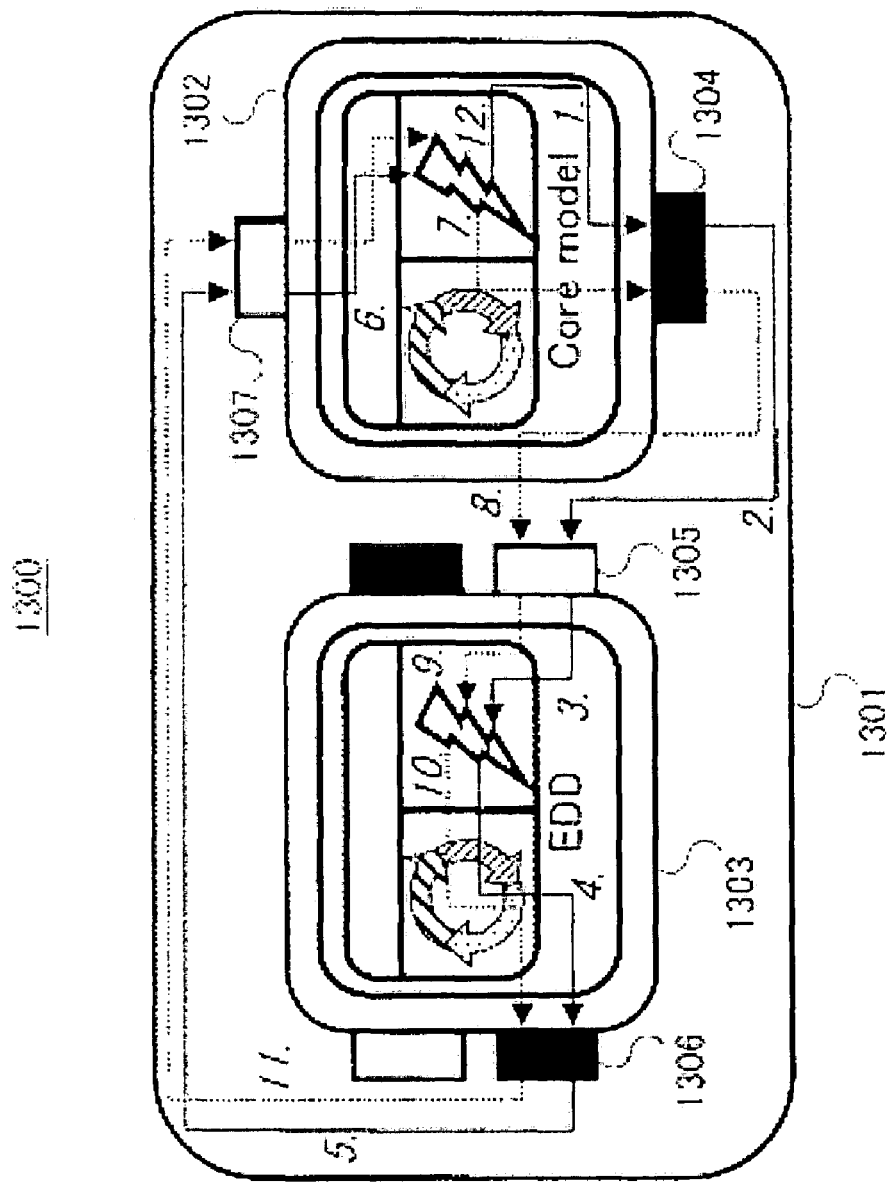
FIG. 17 is a diagram showing an example of the configuration of a slave model that detects a recursive internal event.
Figure 18:
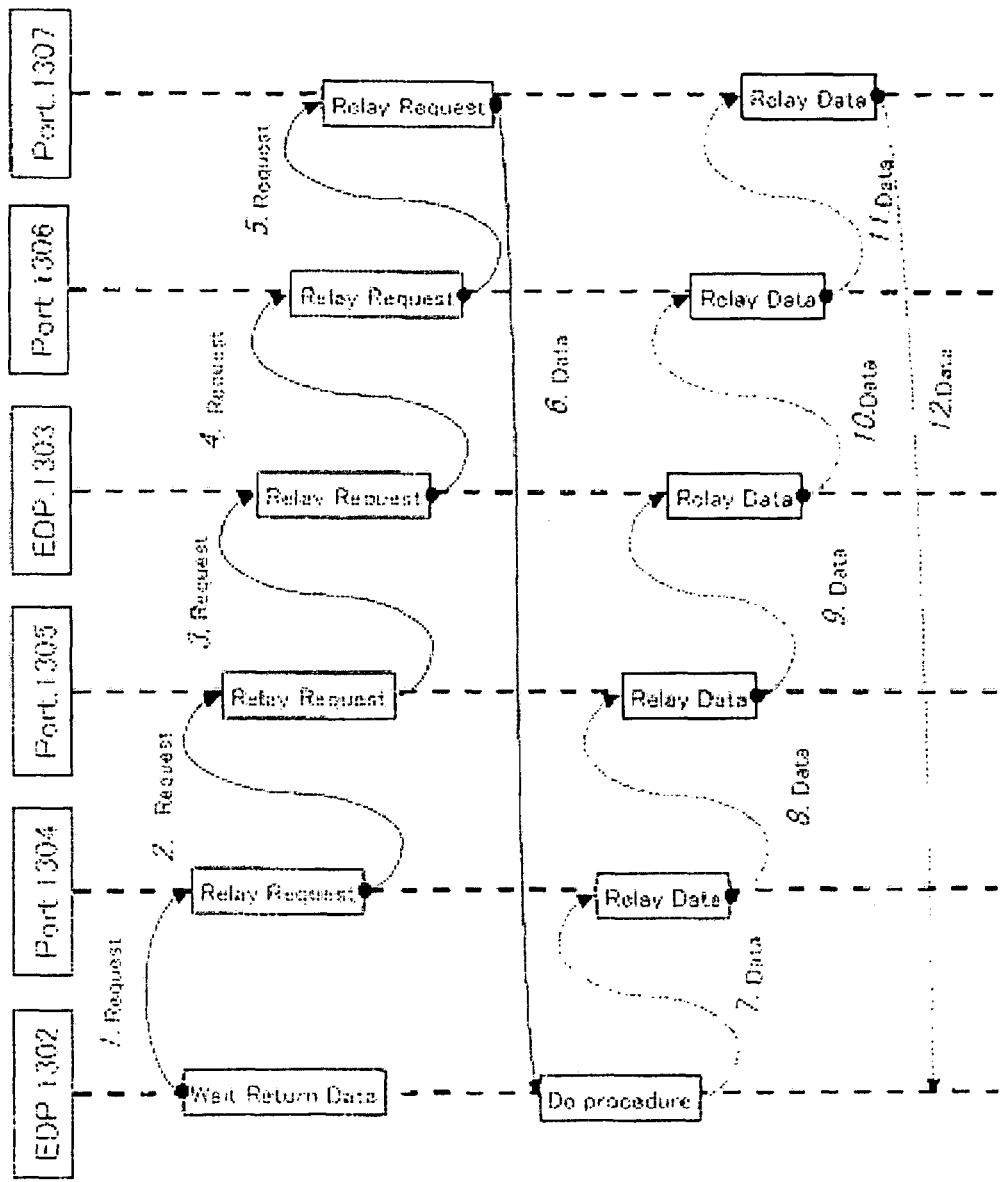
FIG. 18 is a diagram showing the sequence of the slave model that detects a recursive internal event.

FIG. 17 is a diagram showing an example of the configuration of a recursive-type internal event detection slave model 1300. FIG. 18 is a sequence diagram of the recursive-type internal event detection slave model.

In this case, a block model 1301 detects an internal event and an external event and, depending upon the event, the response from a core model 1302 changes.

In this example, the EDP of the core model 1302, activated by some external trigger, recursively generates an event to itself (that is, to the EDP of the core model 1302). The solid line in FIG. 17 indicates the first call, and the dotted line indicates the second call.

A request event generated by the EDP of the core model 1302 (1) is transmitted to a slave port 1305 of an EDD 1303 via a master port 1304 of the core model 1302 (2). In the EDD 1303, the request event is sent directly to the EDP of the EDD 1303 (3) and is relayed to a master port 1306 of the EDD 1303 by the EDP of the EDD 1303 (4). This event is propagated further to a slave port 1307 of the core model 1302 (5) and is passed again to the EDP of the core model 1302 (6).

In this stage, the EDP of the core model 1302 may repeat the procedure that has been done or may branch the procedure control based on some control mechanism, for example, based on the accumulated number of recursive calls. If the procedure that has been done is repeated, the processing will result in an endless loop unless an environment in which multiple events are accepted is built.

This time, if the operation described in the EDP of the core model 1302 is that, unlike the example described above, data is returned in response to the request event, the procedure is repeated with the above-described request event replaced with the return value data.

That is, the return value data generated by the EDP of the core model 1302 (7) is transmitted to the slave port 1305 of the EDD 1303 (8) via the master port 1304 of the core model 1302. In the EDD 1303, this return value data is transmitted directly to the EDP (9) and is relayed to the master port 1306 of the EDD 1303 by the EDP of the EDD 1303 (10). This return value data is propagated further to the slave port 1307 of the core model 1302 (11) and is passed again to the EDP of the core model 1302 (12).

[Multi-Master System]

Figure 19:
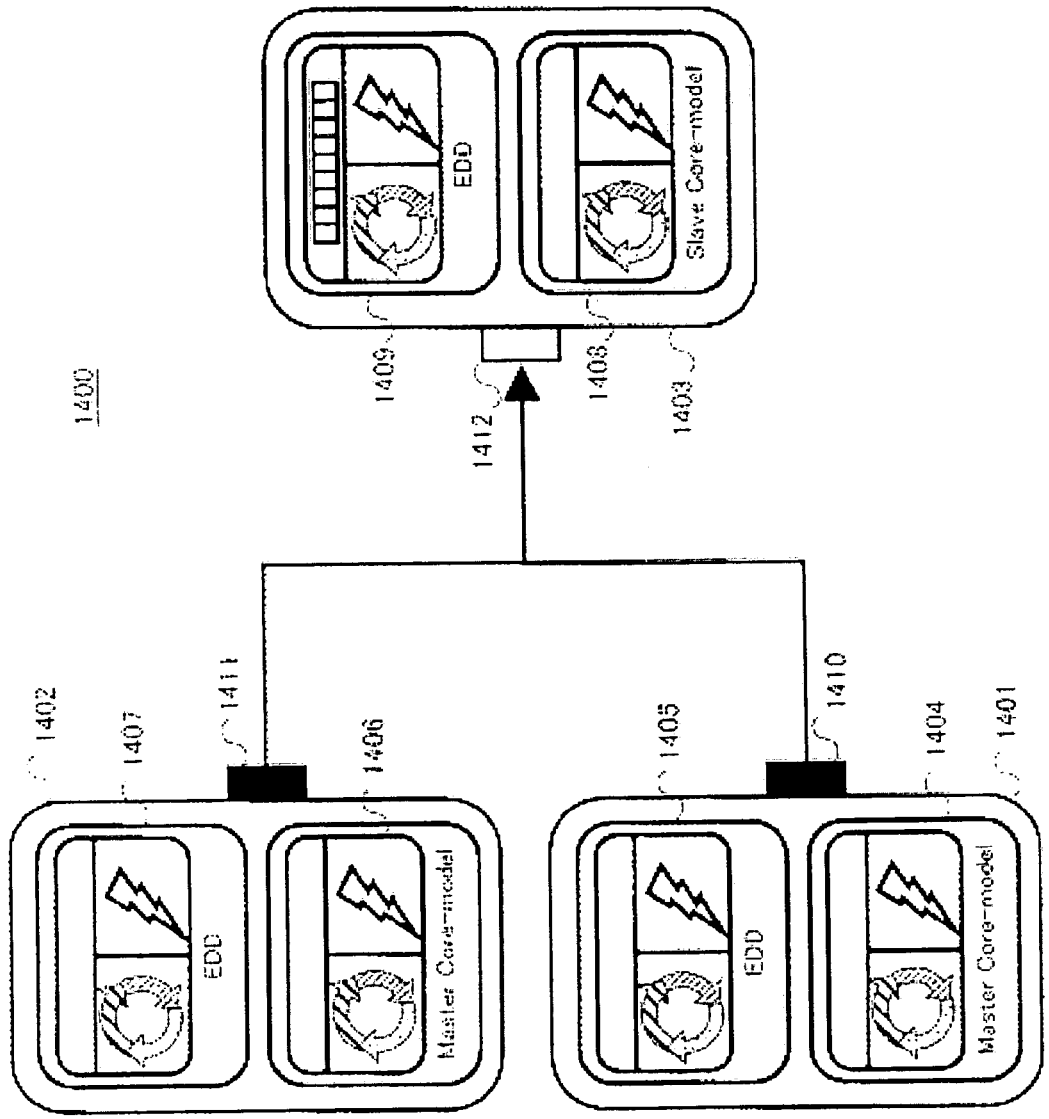
FIG. 19 is a diagram showing an example of the system configuration of a statically-controlled multi-master system device.

FIG. 19 is a diagram showing an example of the system configuration of a statically-controlled multi-master device 1400.

A master block 1401 and a master block 1402, which are independent to each other, share a shared resource block 1403.

The block 1401 includes a core model 1404 in which the operation is described and an EDD 1405, and the block 1402 includes a core model 1406 in which the operation is described and an EDD 1407.

Similarly, the shared resource block 1403 includes a core model 1408 in which the operation is described and an EDD 1409. The blocks are connected in such a way that a master port 1410 of the block 1401 and a master port 1411 of the block 1402 are connected to a slave port 1412 of the block 1403 in the multi-point configuration.

Now, assume that a master event occurs in the block 1401 and is sent to the EDP of the EDD 1409 via the master port 1410 of the block 1401 and the slave port 1412 of the block 1403.

If the activated block 1403 does not accept multiple events at all, the necessary processing is preferably processed only in the EDP of the EDD 1409. If the load of the necessary processing is heavy on the system, the processing may also be transferred to the FSM of the EDD 1409. In this case, if an operation that does not accept multiple events is requested, the control operation is necessary to lock the EDP of the EDD 1409 of the block 1403; if multiple events can be accepted, it is necessary to describe an operation in which a flag is set in the event queue and processing is performed for the event being processed.

Because a control change request is not accepted from an external block in this case, it is necessary to determine to which event a response is to be sent based on fixed priority or on a fixed priority change method.

Now, assume that, when the shared resource block 1403, which is activated by an event that occurred in the block 1401, is performing an operation, an event of the master block 1402, which has priority always higher than that of the master block 1401, is sent to the block 1403. In this case, the EDP of the EDD 1409 adds the event to the event queue.

This causes the event queue to be re-sequenced in the FSM of the EDD 1409 and, after the internal information on the core model is saved as necessary, a start instruction is issued to the core model 1408.

This procedure allows the coordination feature of the shared resources of the multiple masters to be implemented through the description of the EDD without rewriting the operation description of the core model.

[Multi-Master System Capable of Dynamically Changing the Event Processing Order]

This system is the system shown in FIG. 19 to which a controller is added.

Figure 20:
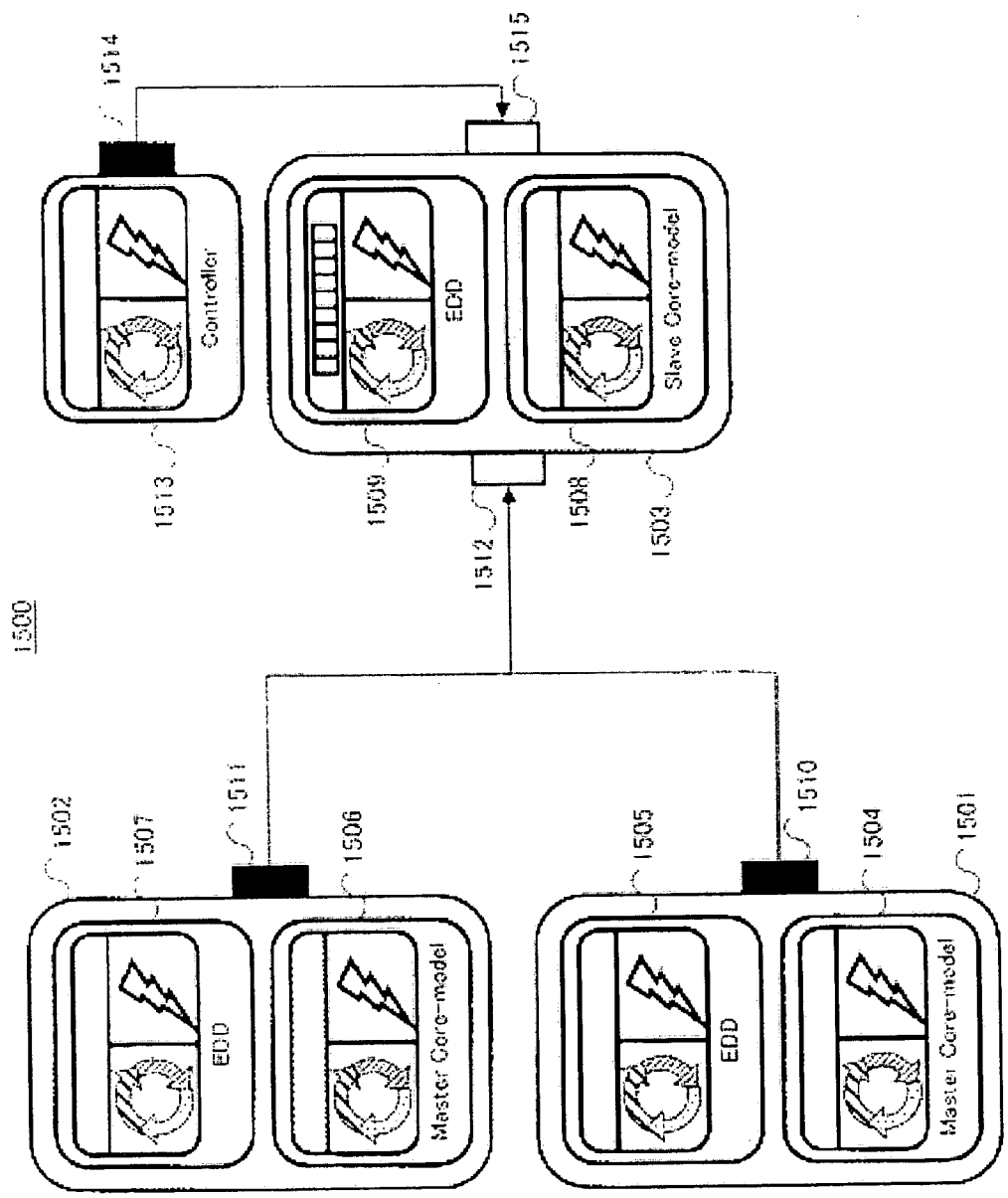
FIG. 20 is a diagram showing an example of the system configuration of a dynamically-controlled multi-master system device.

FIG. 20 is a diagram showing an example of the system configuration of a dynamically-controlled multi-master system device 1500.

A master block 1501 and a master block 1502, which are independent to each other, share a shared resource block 1503.

The block 1501 includes a core model 1504 in which the operation is described and an EDD 1505, and the block 1502 includes a core model 1506 in which the operation is described and an EDD 1507.

Similarly, the shared resource block 1503 includes a core model 1508 in which the operation is described and an EDD 1509. The blocks are connected in such a way that a master port 1510 of the block 1501 and a master port 1511 of the block 1502 are connected to a slave port 1512 of the block 1503 in the multi-point configuration. In addition, a controller 1513 is connected to the block 1503 via a master port 1514 of the controller 1513 and a slave port 1515 of the block 1503.

Now, assume that a master event occurs in the master block 1501 and is sent to the EDP of the EDD 1509 via the port 1510 and the port 1512.

If the activated block 1503 does not accept multiple events at all, the necessary processing is preferably processed only in the EDP. If the load of the necessary processing is heavy on the system, the processing may also be transferred to the FSM. In this case, if an operation that does not accept multiple events is requested, the control operation is necessary to lock the EDP; if multiple events can be accepted, it is necessary to describe an operation in which a flag is set in the event queue and processing is performed for the event being processed.

In this case, a control change request may be accepted from an external block to dynamically control which block's request event the system should process based on the condition and the default priority.

Now, assume that, when the shared resource block 1503, which is activated by an event that occurred in the block 1501, is performing an operation, an event of the master block 1502, which has priority higher than that of the master block 1501 by default, is sent to the block 1503. In this case, the EDP of the EDD 1509 adds the event to the event queue.

In addition, if an input is received from the controller 1513, the processing order can be dynamically changed. For example, if the processing of the block 1501 is urgent, the controller 1513 can increase the priority of the request event processing of the block 1501. As a result, the event queue in the FSM of the EDD 1509 is re-sequenced so that processing order can be changed in real time.

This procedure allows the dynamic coordination feature of the shared resources of the multiple masters to be changed through the description of the EDD and the controller without rewriting the operation description of the core model.

When the system is viewed from the master side, one of the multiple masters is selected by the EDD and the slave function is dynamically changed by the EDD. This means that the connection destination can be dynamically switched and the connection information (topology) on the blocks can be dynamically changed.

[Function Division Exchangeable System]

Figure 21:
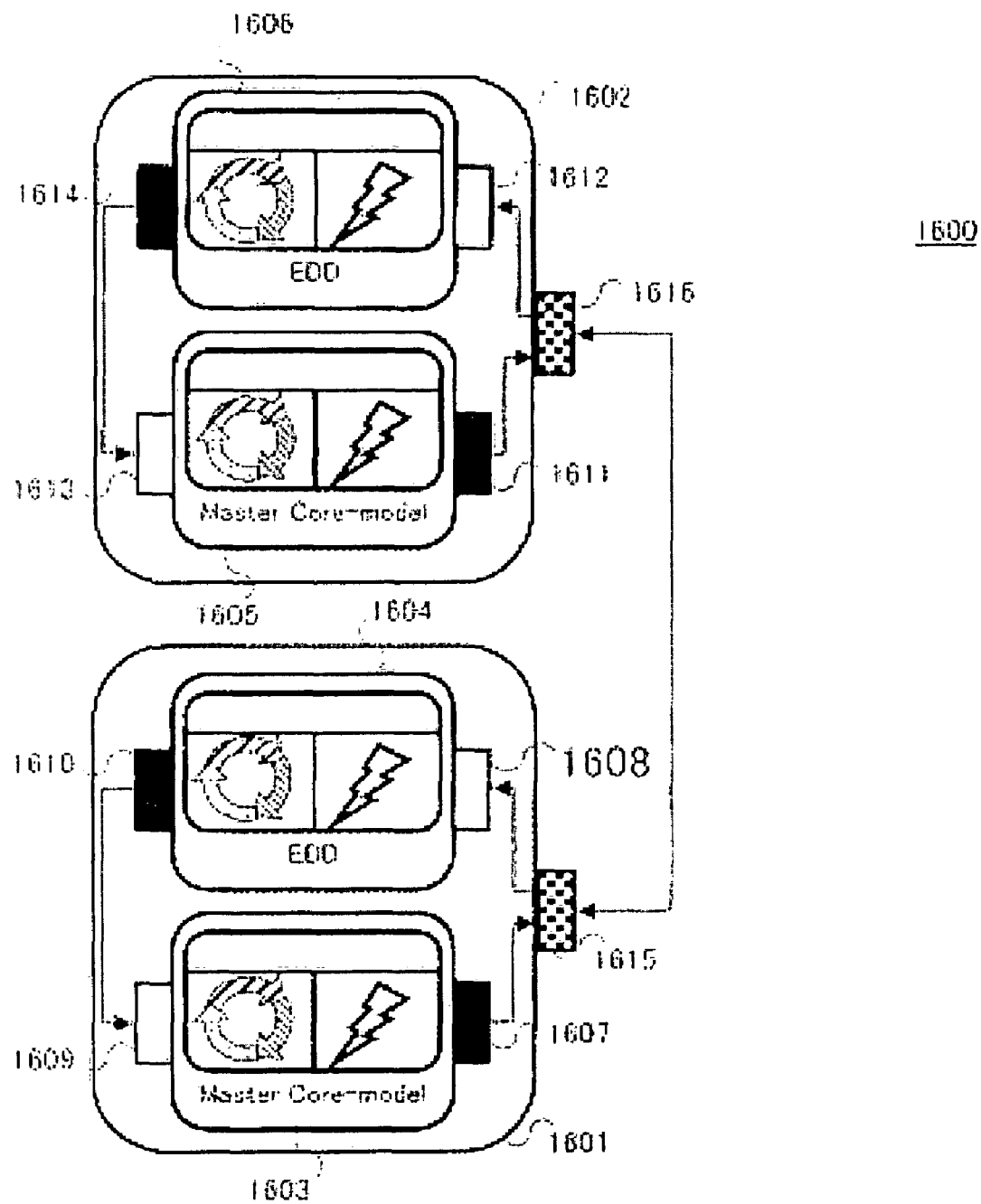
FIG. 21 is a diagram showing an example of the system configuration of a statically-controlled function division exchangeable system device.

FIG. 21 is a diagram showing an example of the system configuration of a statically-controlled function division exchangeable system device 1600.

A block 1601 includes a core model 1603, which describes the operation of the block, and an EDD 1604. A block 1602, independent of the block 1601, includes a core model 1605, which describes the operation of the block, and an EDD 1606.

As with the above-described in-master/out-slave model, a master port 1607 of the core model 1603, an external mutual port 1615, and a slave port 1608 of the EDD 1604 are connected in the block 1601, and a slave port 1609 of the core model 1603 and a master port 1610 of the EDD 1604 are connected.

Similarly, a master port 1611 of the core model 1605, an external mutual port 1616, and a slave port 1612 of the EDD 1606 are connected in the block 1602, and a slave port 1613 of the core model 1605 and a master port 1614 of the EDD 1606 are connected.

As is apparent from the operation of the example shown in FIG. 9, the model structure of the master is identical to the model structure of the slave except only in the true/false setting of the propagation enable of the EDD. That is, if the settings are opposite each other, the relation between the master and the slave is uniquely determined.

In the system 1600, the propagation enable values that are opposite each other can be set according to the rule that is set in the FSM of both EDDs. It is also possible to build a system in which the functions of the master/slave are randomly changed.

[System Capable of Dynamically Exchanging Function Divisions]

This system is the system shown in FIG. 21 to which a controller is added.

Figure 22:
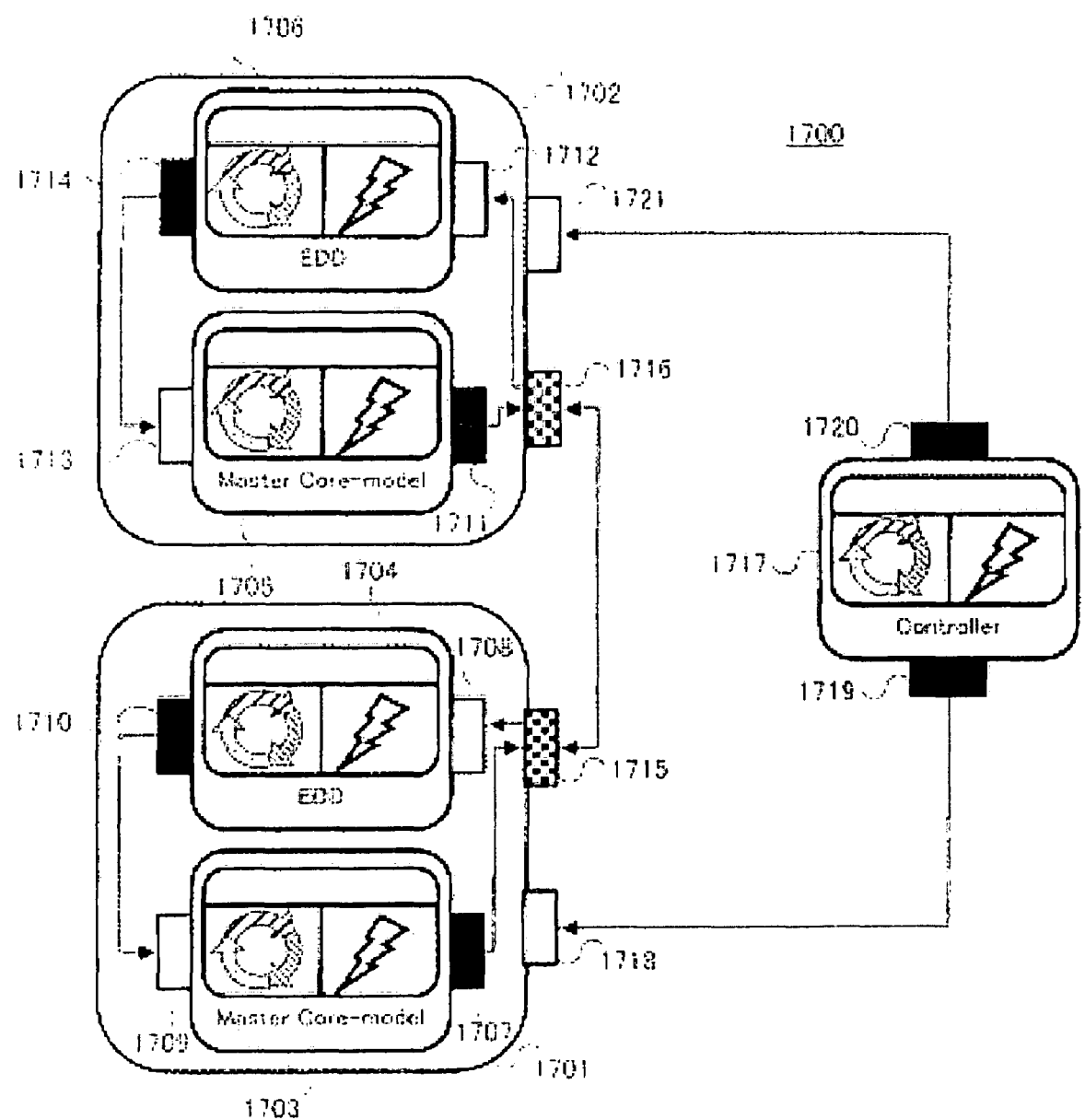
FIG. 22 is a diagram showing an example of the system configuration of a dynamically-controlled function division exchangeable system device.

FIG. 22 is a diagram showing an example of the system configuration of a dynamically-controlled function exchangeable system device 1700.

A block 1701 includes a core model 1703, which describes the operation of the block, and an EDD 1704. A block 1702, independent of the block 1701, includes a core model 1705, which describes the operation of the block, and an EDD 1706.

As with the above-described in-master/out-slave model, a master port 1707 of the core model 1703, an external mutual port 1715, and a slave port 1708 of the EDD 1704 are connected in the block 1701, and a slave port 1709 of the core model 1703 and a master port 1710 of the EDD 1704 are connected.

Similarly, a master port 1711 of the core model 1705, an external mutual port 1716, and a slave port 1712 of the EDD 1706 are connected in the block 1702, and a slave port 1713 of the core model 1705 and a master port 1714 of the EDD 1706 are connected. In addition, the controller 1717 is connected to the block 1701 via a slave port 1718 of the block and a master port 1719 of the controller 1717, and to the block 1702 via a slave port 1721 of the block and a master port 1720 of the controller 1717.

The master and the slave are switched according to the predetermined procedure in the system shown in FIG. 21, while the master and the slave can be dynamically changed by an input from the controller in this example.

Next, the following describes the application of the model of the event direction detector of the present invention to an actual system.

Figure 23:
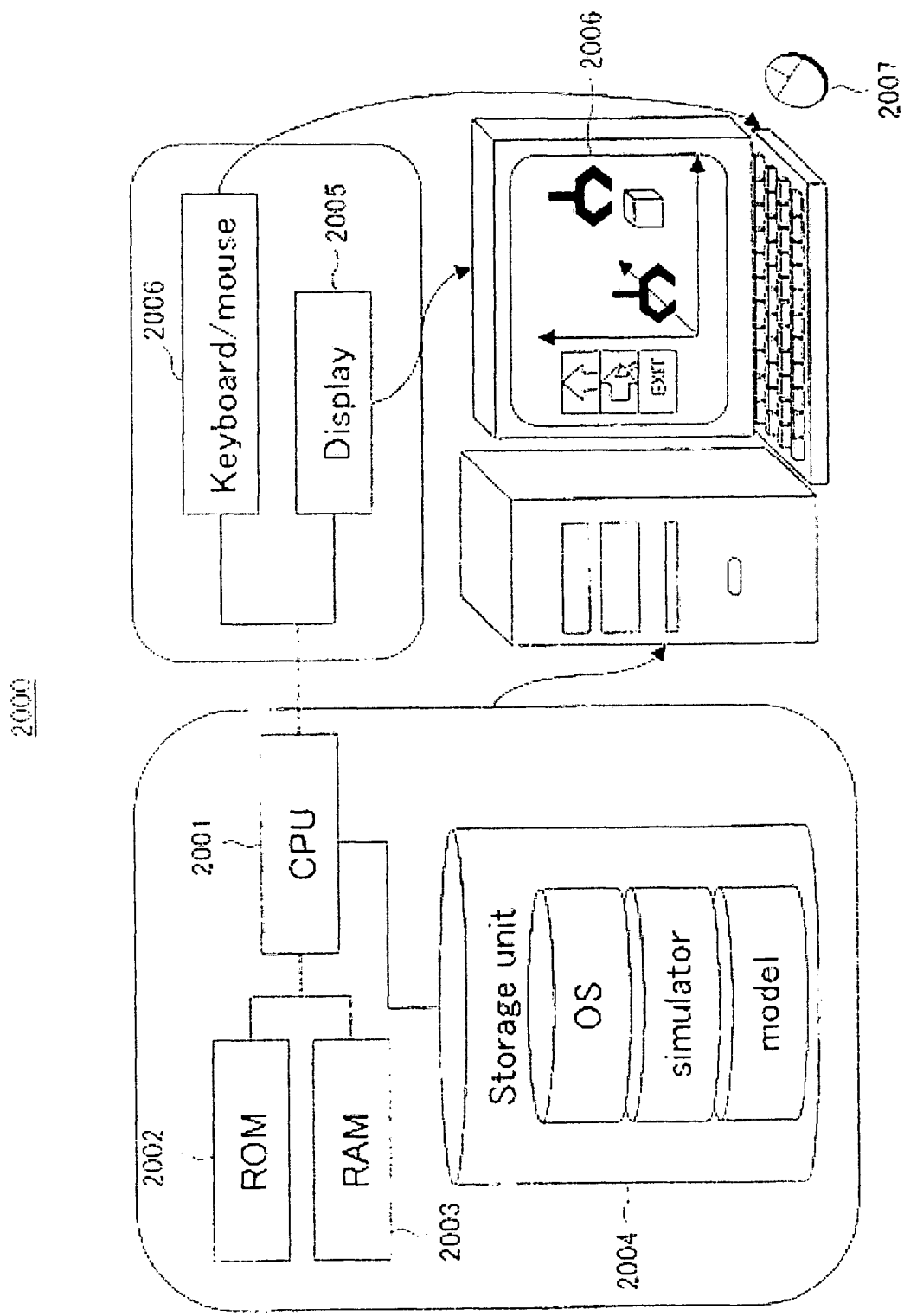
FIG. 23 is a diagram showing the concept of a system configuration to which the event direction detector in this embodiment is applied.

FIG. 23 is a diagram showing the concept of the configuration of a system to which the event direction detector in this present invention is applied.

A system device 2000 basically includes a CPU 2001 that is a processor, a ROM 2002, a RAM 2003, a storage unit 2004, a display apparatus 2005 on which information on a game is displayed, and an operation unit 2006 that includes a keyboard and a mouse.

In this example, the event direction detector is a part of a simulation computation model saved in the storage unit 2004 shown in the figure. At execution time, this model is expanded into the RAM 2003 as the so-called computer software.

That is, this event direction detector can be formed as a component of a mathematical model part.

This event direction detector, used as a part described above, finds many applications and a variety of uses.

To understand the practical use of the event direction detector, the following describes the application of the event direction detector using an example, but the application is not limited to the one described below.

For example, consider the simulation of a crane game, one of arcade games, on a computer.

The real world where time passes equally for everything is a concurrent system. The components of a crane game, that is, an arm that grasps an object, a motor that moves the arm, control buttons that control the arm, and a prize that is the object, are the components of a concurrent system and are present concurrently.

The simulation of the operation of this concurrent system on a computer requires a mathematical model, called a model, and the event direction detector is a part that configures the model as described above.

Figure 24:
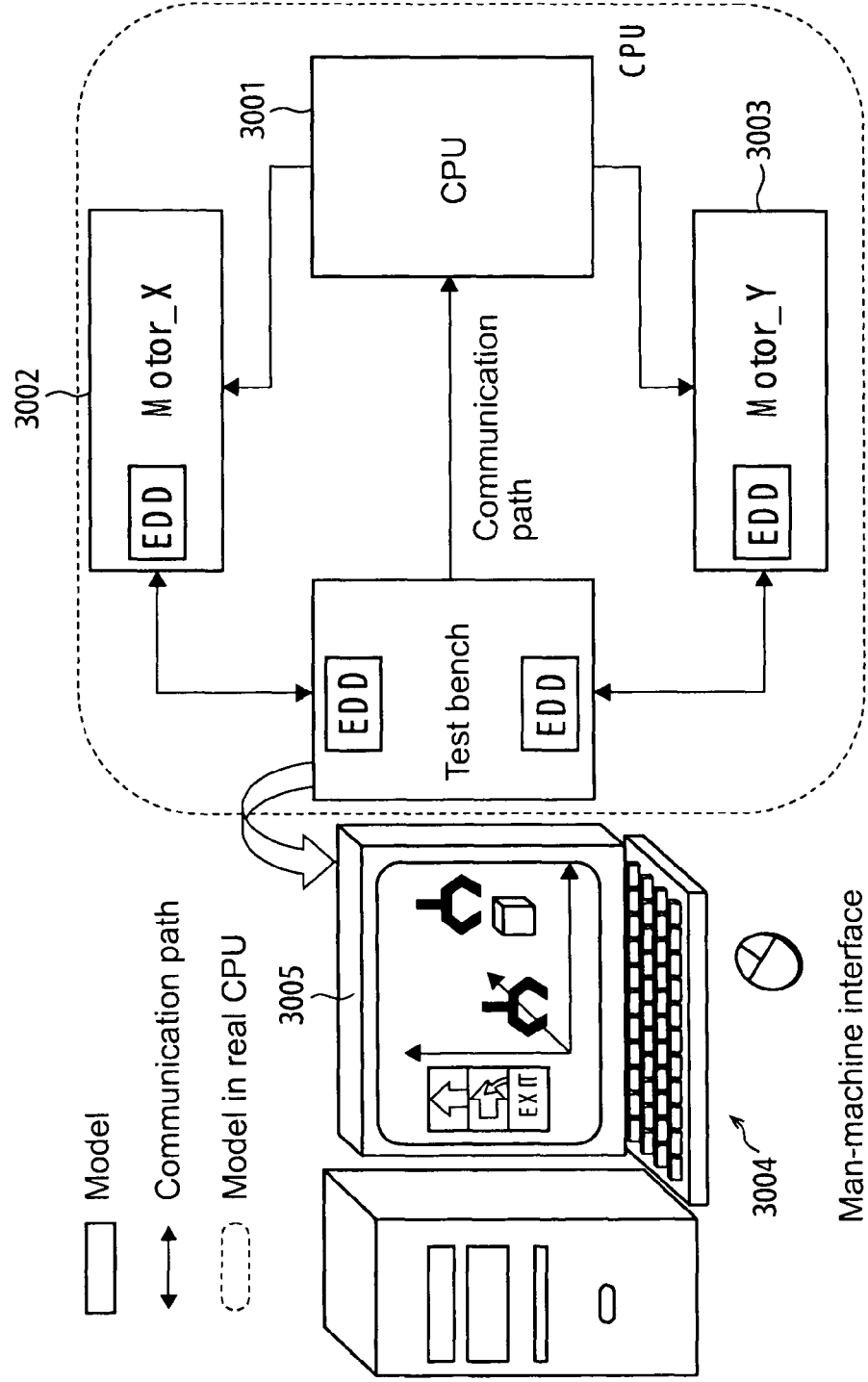
FIG. 24 is a diagram showing the general configuration of a crane game device in this embodiment.

FIG. 24 is a diagram showing the general configuration of a crane game apparatus in this embodiment.

A crane game apparatus 3000 generally includes three blocks: a CPU 3001 that controls the system, motors 3002 and 3003 that move the arm for grasping a prize (two arms in the x-axis and y-axis directions to move the arm two-dimensionally), and a test bench composed of an operation unit 3004 including operation buttons that act as the user interface and a display 3005 on which the system status is displayed.

Figure 25:
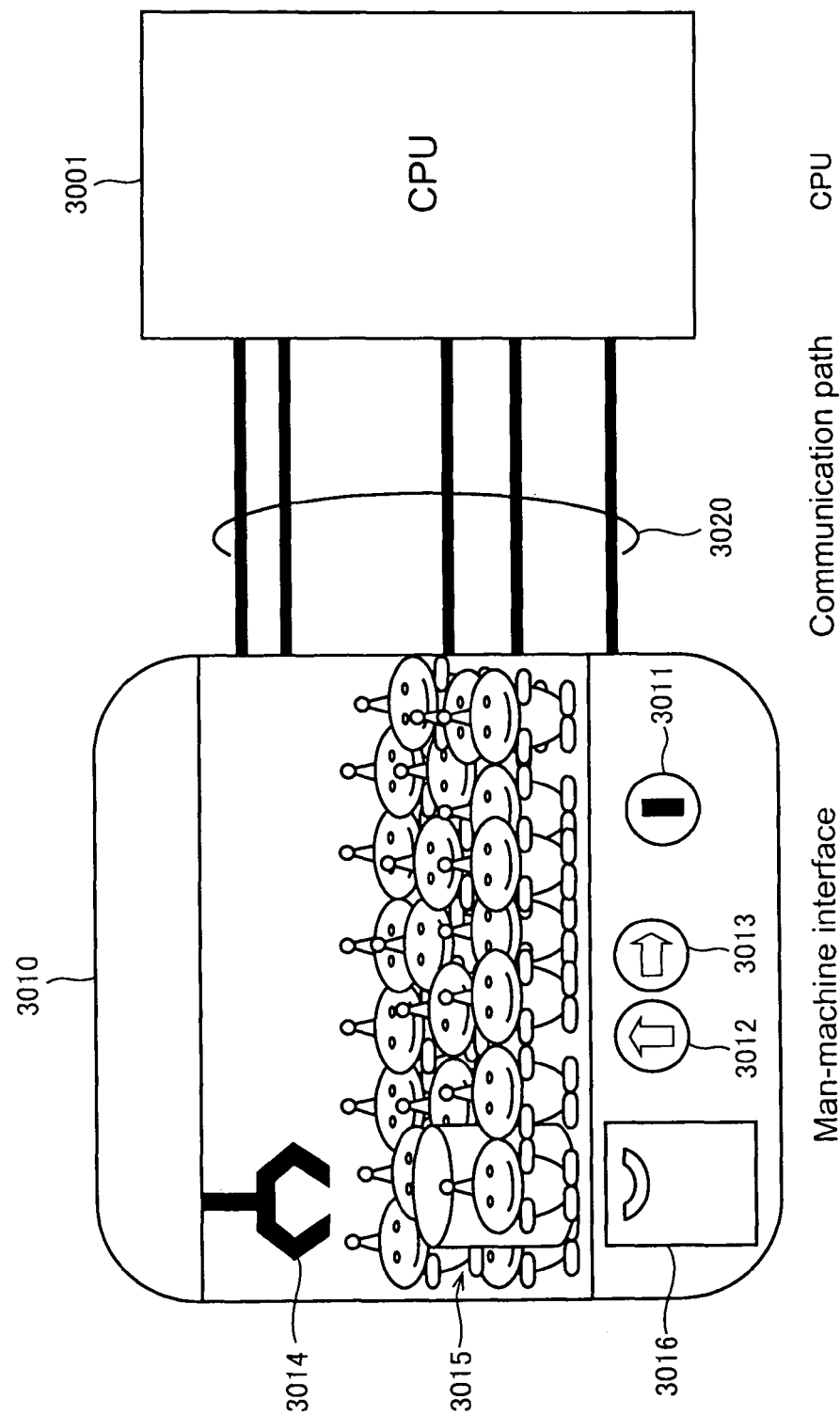
FIG. 25 is a diagram showing the concept of the man-machine interface of a real crane game system.

FIG. 25 is a diagram showing the concept of the man-machine interface of a real crane game system.

The components of a physical (real) man-machine interface 3010 are a coin slot 3011, a depth direction button 3012, a sideways button 3013, an arm 3014, a prize 3015 that is an object to grasp, and a prize retrieval opening 3016.

Out of those components of the physical interface 3010, the physical CPU 3001 controls the coin slot 3011, depth direction button 3012, sideways button 3013, and arm 3014.

The arm 3014 has three motors: two-directional motors 3002 and 3003 controllable by the direction buttons 3012 and 3013 via the CPU 3001, a up/down direction motor controllable not by a player but by the CPU 3001, and a motor that controls the grasping action of the arm. All those components are connected to the CPU 3001 via a communication path 3020.

The communication connection between the physical man-machine interface 3010 and the CPU 3001 is usually made by wires of the electrical conductive material W. A single one-way line is used for each of all signals. Of course, multiple signal lines are used in the system in its entirety.

The configuration of the model in FIG. 24 is basically the same as that of the real system except that a virtual reality model is necessary for a part corresponding to the user interface in the real system.

In the system in the example, the control input interface, which is modeled as the test bench and via which the operation buttons are pressed and a coin is inserted, is provided by the mouse and the keyboard that act as the pseudo-switches. In addition, actions visible in the real world, such as the operation of the arm 3014 and the movement of a prize, are provided as the output graphics user interface on the display 3005 that is a display monitor.

The components of the physical man-machine interface include only the display monitor (display apparatus), the keyboard, and the mouse.

All models are loaded in the physical CPU 3001. The real CPU is also modeled as a CPU model.

The communication between the physical man-machine interface and the physical CPU is also implemented as a model. Out of multiple signal lines in the system model, a single line is used for a set of signal lines if the control direction is opposite to the data direction and if the control signal and the data signal do not occur at the same time. This line is called a single, two-way line in this example.

Because one line is used for the control signal and the data signal, the term "single" is used. The term "single" does not mean that there is only one line in the system. There are multiple single lines, one for each set.

The event direction detector in this embodiment is connected to both ends of a single line, used for a set of the control signal and the data signal described above, and is provided in each model.

Figure 26:
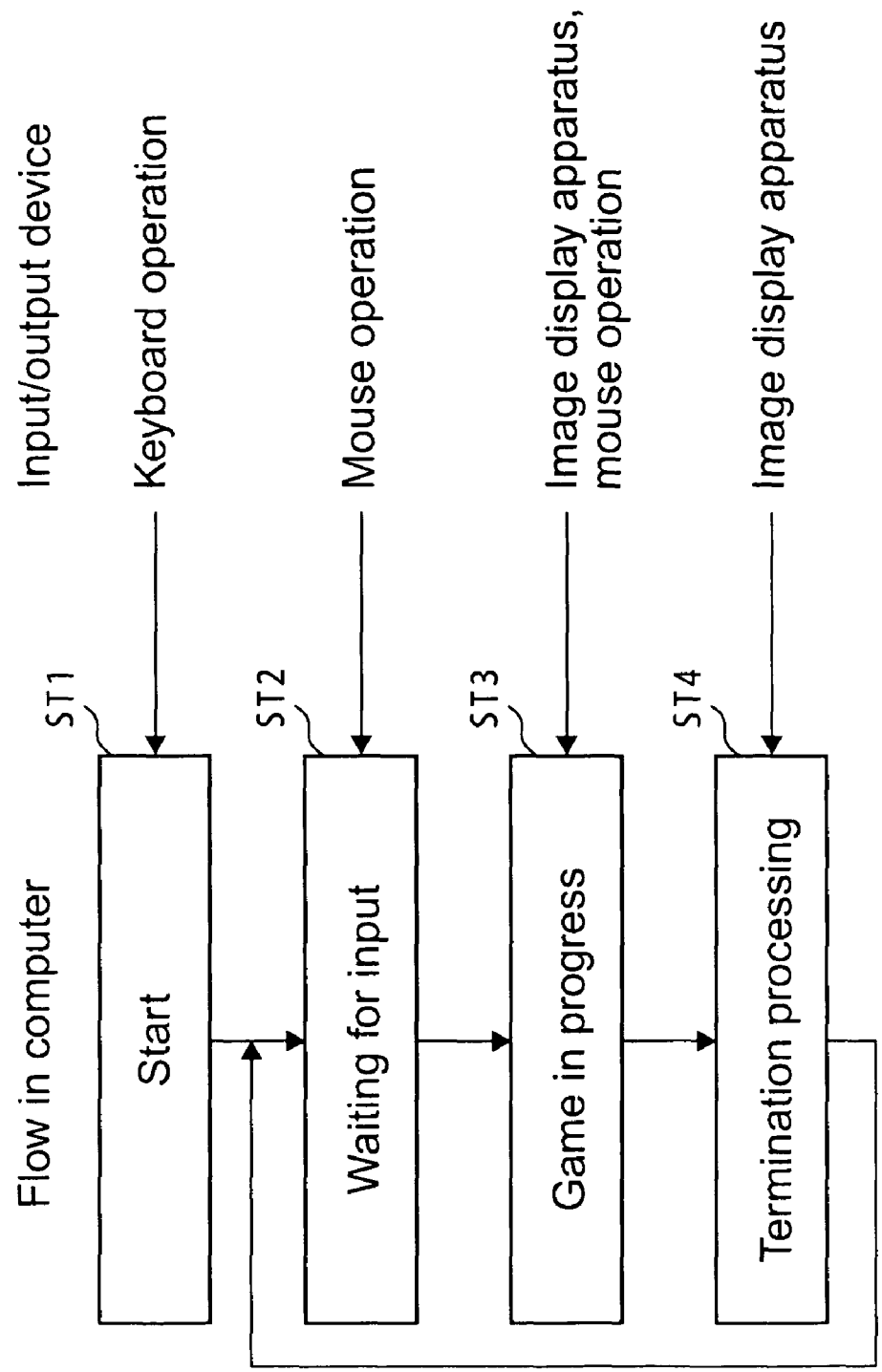
FIG. 26 is a flowchart showing the whole system shown in FIG. 23 and FIG. 24.

FIG. 26 is a general flowchart of the whole system shown in FIG. 23 and FIG. 24.

The following describes an example of the operation of the system with reference to this flowchart.

Start Step ST1:

A run command is entered from the keyboard. This command causes an execution program, which includes a mathematical model, to be expanded into the RAM as computer software.

In the real system, this step is a power-on step.

Input Waiting Step ST2:

The user operation buttons are displayed on the image display apparatus, and the initial screen of the crane game is displayed on the monitor.

In the real system, the system waits for the player, who inserted a coin, to press a button.

Game In-Progress Step ST3:

When the user presses the buttons in correct order (in order of sideway movement button and depth movement button), the motor model corresponding to the pressed button starts the operation and the screen of the crane game is drawn on the monitor according to the arm coordinates calculated by the motor model.

This sequence of operations is controlled by the processor model. During this time, the processor model keeps inquiring of the test bench model whether a button is pressed and where the arm 3014, moved by the motor, is positioned. The event direction detector is used to perform the sequence of this inquiry and response via one communication path. That is, an inquiry from the processor side is treated as a control signal and a response from the test bench is identified in the system as data.

In the real system, the same steps are executed except that an attempt is made by the physical arm to actually acquire a physical prize. All steps of the core part, which will be described later, are executed during this sequence of operations.

That is, when an inquiry about the position of the arm 3014 is issued once, the following are sent in the real crane game.
a. Inquiry about arm coordinates (Control signal: From physical CPU to physical arm)
b. Response of arm coordinate data (Data signal: From physical arm to physical CPU)
Each of the above two is sent via one communication path, that is, this set of the inquiry and the response are sent via two communication paths.

The operations of a and b described above are the operations of the real crane game, and those operations correspond to the function to confirm the arm position.

Apparently, one communication path is required for each of the operations of a and b in the real crane game; in contrast, this event direction detector allows one communication path to be used for the two operations, thus reducing the number of communication paths to half.

Termination Processing Step ST4:

When the player presses and then releases the depth direction button, the arm 3014 automatically drops down and closes the arm. At this time, if the prize coordinates match the arm coordinates, the arm 3014 grasps the prize. The arm 3014 rises again with its arm closed, moves to the start position by means of the motor, and opens the arm 3014. If the arm grasps the prize successfully, the prize drops and the player can get it.

The same steps are executed also in the real system.

Then, control is passed back to step ST2.

In the real system, too, the system waits for a player to insert a coin.

Figure 27:
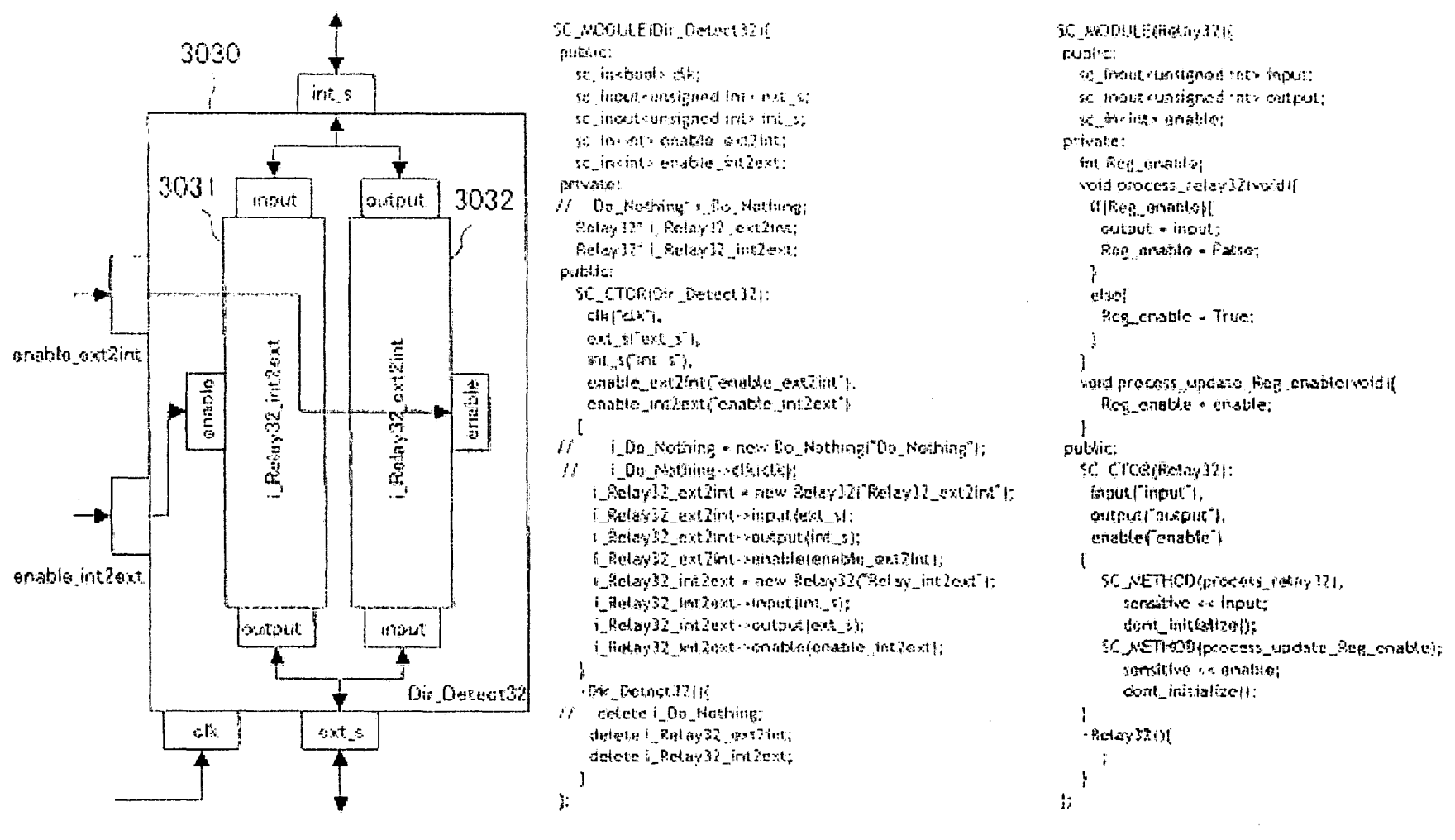

FIG. 27 is a diagram showing the actual coding of the core part.

Although the core part is coded in SytemC, one of standard system-level design languages, in this example, the present invention is not limited to this language (Coding in the SpecC language is also available as an example).

In this example, the operation performed in response to an event is controlled by an enable variable. This will be described with reference to the flowchart in FIG. 28.

In a core part 3030, a relay module for relaying a signal is instantiated to two modules, 3031 for an internal event and 3032 for an external event.

The core module 3030 has only a function to instantiate sub-modules to hierarchical modules but does not have a process.

The relay modules 3031 and 3032, which are sub-modules of the core module 3030, are leaf modules that do not have sub-modules internally but have processes for implementing the functions.

The clock clk port, though included in the core part, is not used because no autonomous operation is required at all in this example.

Figure 28:
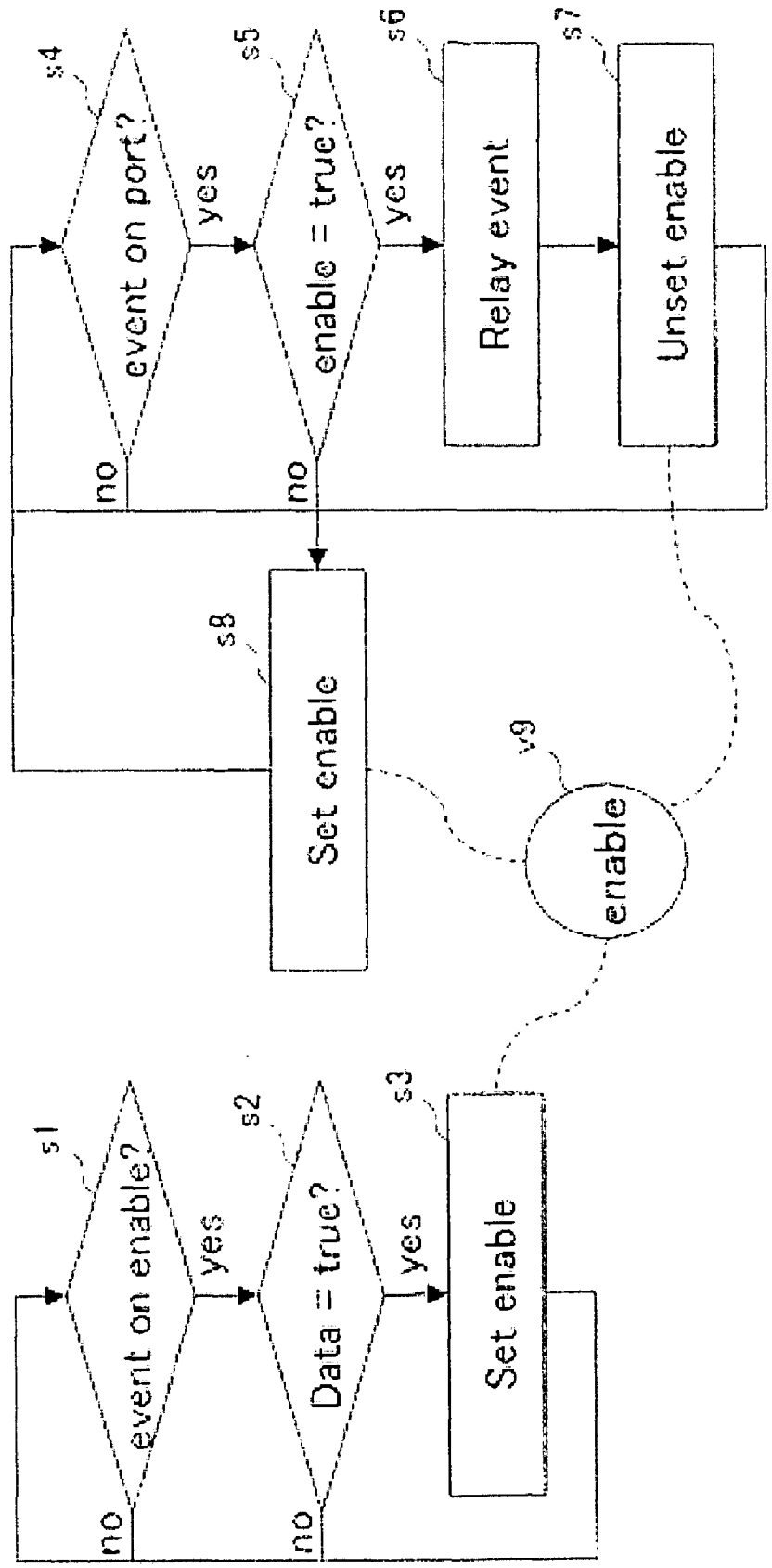
FIG. 28 is a flowchart showing the core part shown in FIG. 27.

FIG. 28 is a flowchart of the core part shown in FIG. 27.

The event direction detector is composed of two control flows that are related by "v9: enable variable" shown in the figure.

To avoid confusion, the enable port is represented by enable, while the enable variable is represented by 'enable'.

<'Enable' Control Flow (Flow Bound to Enable Port of Core Part>

The enable port event control flow includes the following three steps.

The first step s1 is a step for determining if an enable port event is generated.

The second step s2 is a step for determining if an 'enable' request is received.

The third step s3 is a step for setting the 'enable' variable.

The following describes the control transition between steps.

Step s1:
If an event is generated on the enable port (s1: yes), control is passed to step S2. If not (s1: no), control returns to step s1.
Step s2:
If the enable port value is true (s2: yes), control is passed to step s3. If false (s2: no), control returns to step s1.
Step s3:
The 'enable' variable is set to true, and control returns to step s1.

<Event Control Flow (Flow Bound to Input Port of Core Part)>

This input port event control flow includes five steps, from fourth to eighth.

The fourth step s4 is a step for determining if an input port event is generated.

The fifth step s5 is a step for determining if an 'enable' request is received.

The sixth step s6 is a step for relay.

The seventh step s7 is a step for unsetting the 'enable' variable.

The eighth step s8 is a step for setting the 'enable' variable.

The following describes the control transition between the steps.

Step s4:
If an event is generated on the input port (s4: yes), control is passed to step s5. If not (s4: no), control returns to step s4.
Step s5:
If the 'enable' variable is true (s5: yes), control is passed to step s6. If false (s5: no), control is passed to step s8.
Step s6:
The event is relayed (to the output port of the core part), and control is passed to step s7.
Step s7:
The 'enable' variable is set to false, and control is passed to step s4.
Step s8:
The 'enable' variable is set to true, and control is passed to step s4.

Because the event direction detector in this embodiment detects an event direction and, in addition, the operation to be performed after the event detection can be changed according to various conditions as described above, the embodiment has the following effects.

The ability to determine from which terminal a signal is input allows the operation to be switched based on the event direction.

Sharing the part configuration increases the readability of a model, and sharing operation parts increases the reusability of a model.

Changing the event propagation method allows the model operation order to be changed, making it possible to build a real-time oriented system.

The use of an event queue allows the model operation order to be changed, thus increasing real-time ability.

Performing the master/slave operation via one transmission path allows an algorithm to be easily transformed into an electronic system model.

The ability to switch an access from multiple master blocks to a shared block makes it easy to unify the shared resources when creating a parallel, concurrent electronic system model from an ordering algorithm.

The ability to change an access from multiple master blocks to a shared block based on a dynamic condition ensures the increased real-time ability.

A dynamic change in the link between blocks enables an operation model to be created that can be dynamically reconfigured.

Switching between the master function and the slave function based on a dynamic condition allows the polymorphism of an algorithm to be introduced into a model. This ability allows a block, which makes a call in the same way but performs different functions, to be created as a system configuration part.

The present invention contains subject mater related to Japanese Patent Application No. JP2006-004110 filed in the Japanese Patent Office on Jan. 11, 2006, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An event direction detector comprising:
a processor which includes:
an event detection part that includes a finite state machine part in a steady state and an event driven processing unit, distinguishes between an external event and an internal event, and detects an direction of an event, said finite state machine part and said event driven processing unit being combined via a shared variable internal to a block;
an external event input terminal via which an external event is input;
an external event output terminal via which the external event is output;
a first operation function that acts as an intermediary of an input/output of the external event and that transfers an external event input to an external event output;
an internal event input terminal via which an internal event is input;
an internal event output terminal via which the internal event is output;
a second operation function that acts as an intermediary of an input/output of the internal event and that transfers an internal event input to an internal event output;
a third operation function that transfers the outputs to said finite state machine of the block;

a first editing function that receives and edits the external event input terminal, via which the external event is input, and the external event output terminal via which the external event is output;
a second editing function that receives and edits said first operation function;
a third editing function that receives and edits the internal event input terminal, via which the internal event is input, and the internal event output terminal via which the internal event is output;
a fourth editing function that receives and edits said second operation function; and
a steady-state response processing unit, composed of a finite state machine, and an event driven processing unit;
a shared unit that acts as an intermediary between said processing units;
a fifth editing function that receives and edits operation specifications of said steady-state response processing unit, composed of a finite state machine, and said event driven processing unit; and
a sixth editing function that receives and edits components of said shared unit that acts as an intermediary between said processing units.

2. The event direction detector according to claim 1, further comprising:
a sub-block unit having a steady-state response processing unit composed of a finite state machine, an event driven processing unit, and a shared unit that acts as an intermediary between said processing units;
a fifth editing function that receives and edits operations of said steady-state response processing unit and said event driven processing unit of said sub-block; and
a sixth editing function that receives and edits components of said shared unit that acts as an intermediary between said processing units.

3. The event direction detector according to claim 1, further comprising:
a sub-block unit having a steady-state response processing unit composed of a finite state machine, an event driven processing unit, and a shared unit that acts as an intermediary between said processing units;
an input terminal via which control is received from said sub-block;
holding means that holds an input value;
a fifth editing function that receives and edits said input terminal via which control is received from said sub-block; and
a sixth editing function that receives and edits an operation of said holding means that holds the input value.

4. The event direction detector according to claim 1, further comprising:
holding means that holds a number of times an event is detected or contents of an event; and
a fifth editing function that receives and edits an operation of said holding means that holds the number of times an event is detected and the contents of an event.

5. An event direction detection method that distinguishes between an external event and an internal event and detects a direction of an event, comprising:
distinguishing between the external event and the internal event and detecting the direction of the event by using a finite state machine part in a steady state and an event driven processing unit combined via a shared variable internal to a block;
a first step of acting as an intermediary of an input/output of the external event and transferring an external event input to an external event output;
a second step of acting as an intermediary of an input/output of the internal event and transferring an internal event input to an internal event output;
a third step of transferring the outputs to the finite state machine of a block;
a fourth step of receiving and editing an external event input terminal, via which the external event is input, and an external event output terminal via which the external event is output;
a fifth step of receiving and editing said first step;
a sixth step of receiving and editing an internal event input terminal, via which the internal event is input, and an internal event output terminal via which the internal event is output;
a seventh step of receiving and editing said second step;
an eighth step of receiving and editing specifications of a steady-state response processing unit composed of the finite state machine, and the event driven processing unit; and
a ninth step of receiving and editing components of a shared unit that acts as an intermediary between the processing units.

\* \* \* \* \*